United States Patent
Tseng et al.

(10) Patent No.: US 11,419,022 B2
(45) Date of Patent: Aug. 16, 2022

(54) CELL PRIORITIZATION FOR CELL (RE)SELECTION IN WIRELESS COMMUNICATION SYSTEMS

(71) Applicant: FG Innovation Company Limited, Tuen Mun (CN)

(72) Inventors: Yung-Lan Tseng, Hsinchu (TW); Mei-Ju Shih, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 99 days.

(21) Appl. No.: 16/405,268

(22) Filed: May 7, 2019

(65) Prior Publication Data
US 2019/0349825 A1    Nov. 14, 2019

Related U.S. Application Data

(60) Provisional application No. 62/670,238, filed on May 11, 2018.

(51) Int. Cl.
| | | |
|---|---|---|
| *H04W 36/00* | (2009.01) | |
| *H04W 36/08* | (2009.01) | |
| *H04W 76/27* | (2018.01) | |
| *H04W 84/04* | (2009.01) | |

(52) U.S. Cl.
CPC ..... *H04W 36/00835* (2018.08); *H04W 36/08* (2013.01); *H04W 76/27* (2018.02); *H04W 84/042* (2013.01)

(58) Field of Classification Search
CPC ........... H04W 36/00835; H04W 36/08; H04W 76/27; H04W 84/042

USPC ................................ 370/310, 328, 329, 331
See application file for complete search history.

(56) References Cited

U.S. PATENT DOCUMENTS

| | | | |
|---|---|---|---|
| 10,652,948 B2* | 5/2020 | Da Silva | H04W 8/08 |
| 10,952,108 B2* | 3/2021 | Wu | H04W 36/0022 |
| 2016/0337961 A1* | 11/2016 | Hu | H04B 17/318 |
| 2016/0373995 A1* | 12/2016 | Kinthada Venkata | H04W 36/0083 |
| 2018/0132141 A1* | 5/2018 | Huang-Fu | H04L 65/1083 |
| 2018/0255484 A1* | 9/2018 | Wu | H04B 7/0413 |
| 2018/0376444 A1* | 12/2018 | Kim | H04W 4/70 |
| 2019/0261264 A1* | 8/2019 | Lou | H04W 48/18 |
| 2019/0268782 A1* | 8/2019 | Martin | H04W 36/0094 |
| 2019/0281524 A1* | 9/2019 | Rugeland | H04W 36/30 |
| 2019/0297538 A1* | 9/2019 | Keller | H04W 36/0022 |
| 2019/0342804 A1* | 11/2019 | Futaki | H04W 36/14 |
| 2019/0349820 A1* | 11/2019 | Zhang | H04W 36/00 |
| 2019/0357129 A1* | 11/2019 | Park | H04W 60/00 |
| 2019/0364541 A1* | 11/2019 | Ryu | H04W 72/02 |
| 2020/0022214 A1* | 1/2020 | Takahashi | H04W 74/0833 |
| 2020/0068646 A1* | 2/2020 | Kwon | H04W 68/02 |
| 2020/0178343 A1* | 6/2020 | Kim | H04W 76/18 |

(Continued)

*Primary Examiner* — Obaidul Huq
(74) *Attorney, Agent, or Firm* — ScienBiziP, P.C.

(57) ABSTRACT

Some of the present embodiments provide a method for a user equipment (UE) for cell (re)selection, while the UE is in a radio resource control (RRC) inactive state. The method includes assigning a cell (re)selection priority level to a plurality of candidate cells based on a core network connection support of each of the plurality of candidate cells, and selecting, in a cell (re)selection procedure, a serving cell from the plurality of candidate cells, the serving cell having a highest cell (re)selection priority level.

16 Claims, 12 Drawing Sheets

(56) References Cited

U.S. PATENT DOCUMENTS

2020/0187073 A1\* 6/2020 Ma ................... H04W 36/0061
2020/0275335 A1\* 8/2020 Wu ....................... H04W 36/24
2020/0275352 A1\* 8/2020 Yang .................... H04W 48/16
2020/0351733 A1\* 11/2020 Tao ...................... H04W 76/27

\* cited by examiner

```
RRC Connection Release message
........

InactiveModeMobilityControlInfo ::=    SEQUENCE {
``` freqPriorityListEUTRA_EPC          FreqPriorityListEUTRA freqPriorityListEUTRA_5GC          FreqPriorityListEUTRA freqPriorityListNewRadio               FreqPriorityListNewRadio freqPriorityListEUTRA                  FreqPriorityListEUTRA freqPriorityListGERAN                  FreqPriorityListGERAN freqPriorityListUTRA-FDD               FreqPriorityListUTRA-FDD freqPriorityListUTRA-TDD               FreqPriorityListUTRA-TDD bandClassPriorityListHRPD bandClassPriorityListHRPD OPTIONAL, bandClassPriorityList1XRTT             bandClassPriorityList1XRTT

FreqPrioritListEUTRA & UE Monitoring Result

| FreqPrioritListEUTRA | DETECTED CELLS IN UE SIDE |
|---|---|
| Freq.#a (1st priority) | Cell#a1 (best) (connects with EPC), Cell#a2 (connects with 5GC) |
| Freq.#b (2nd priority) | Cell#b1 (best) (connects with 5GC), Cell#b2, Cell#b3 |
| Freq.#c (3rd priority) | Cell#c1 (camped Cell) |

FreqPrioritListEUTRA & UE Monitoring Result

| FreqPrioritListEUTRA | DETECTED CELLS IN UE SIDE |
|---|---|
| Freq.#b (1st priority) | Cell#b1 (best) (connects with 5GC), Cell#b2, Cell#b3 |
| Freq.#c (2nd priority) | Cell#c1 (camped Cell) |
| Freq.#a (3rd priority) | Cell#a1 (best) (connects with EPC), Cell#a2 (connects with 5GC) |

| FreqPrioritListEUTRA & UE Monitoring Result | |
|---|---|
| FreqPrioritListEUTRA | DETECTED CELLS IN UE SIDE |
| Freq.#a (1$^{st}$ priority) | Cell#a1 (best) (connects with EPC), Cell#a2 (connects with EPC) |
| Freq.#b (2$^{nd}$ priority) | Cell#b1 (best) (connects with EPC), Cell#b2 (connects with EPC), Cell#b3 (connects with 5GC) |
| Freq.#c (3$^{rd}$ priority) | Cell#c1 (camped Cell) |
| Freq.#d (4$^{th}$ priority) | N.A. |

| FreqPrioritListEUTRA & UE Monitoring Result | |
|---|---|
| FreqPrioritListEUTRA | DETECTED CELLS IN UE SIDE |
| Freq.#c (1$^{st}$ priority) | Cell#c1 (camped Cell) |
| Freq.#d (2$^{nd}$ priority) | Cell#d1 (best) (connects with 5GC) |
| Freq.#a (3$^{rd}$ priority) | Cell#a1 (best) (connects with EPC), Cell#a2 (connects with EPC) |
| Freq.#b (4$^{th}$ priority) | Cell#b1 (best) (connects with EPC), Cell#b2 (connects with EPC), Cell#b3 (connects with 5GC) |

| FreqPrioritListEUTRA & UE Monitoring Result ||
|---|---|
| FreqPrioritListEUTRA | DETECTED CELLS IN UE SIDE |
| Freq.#c (1$^{st}$ priority) | Cell#c1 (camped Cell) |
| Freq.#a (2$^{nd}$ priority) | Cell#a1 (best) (connects with EPC), Cell#a2 (connects with EPC) |
| Freq.#b (3$^{rd}$ priority) | Cell#b1 (best) (connects with EPC), Cell#b2 (connects with EPC), Cell#b3 (connects with 5GC) |
| Freq.#d (4$^{th}$ priority) | Cell#d1 (best) (connects with EPC) |

CELL PRIORITIZATION FOR CELL (RE)SELECTION IN WIRELESS COMMUNICATION SYSTEMS

CROSS-REFERENCE TO RELATED APPLICATION(S)

The present application claims the benefit of and priority to a provisional U.S. Patent Application Ser. No. 62/670,238, filed on May 11, 2018, entitled "Cell (Re)selection Rules for UEs in RRC Inactive State," with 62/670,239 (hereinafter referred to as "62/670,239 application"). The disclosure of the 62/670,239 application is hereby incorporated fully by reference into the present application.

FIELD

The present disclosure generally relates to wireless communications, and more particularly, to cell prioritization for cell (re)selection in the next generation networks.

BACKGROUND

A base station may create one or more cells in the Radio Access Network (RAN) on one or more frequency bands. A user equipment (UE) may select one of the cells based on one or more criteria to communicate with the core network (CN). For example, a UE that is in a (LTE, Long Term Evolution) Radio Resource Control (RRC) inactive state (e.g., in a 5G communication network) may select (or reselect) a candidate cell (e.g., a suitable cell) based on different cell (re)selection criteria, such as frequency prioritization rules, S-criteria, R-criteria, etc. A potential candidate cell for cell (re)selection may support different types of CN connections. For example, the candidate cell may only be connected, or be able to connect, to an Evolved Packet Core (EPC) network, to a 5G Core (5GC) network, or to both EPC and 5GC networks. As agreed in the 3rd Generation Partnership Project (3GPP), if an inactive UE selects a candidate cell that does not support the 5GC network connection, the UE may change its status from inactive to idle and release the UE's configuration among other actions. There is a need in the art to prioritize the candidate cells for a cell (re)selection procedure in order to make cell (re)selection more efficient.

SUMMARY

The present disclosure is directed to cell prioritization for cell (re)selection in the next generation networks.

In a first aspect of the present application, a method for a user equipment (UE) for cell (re)selection while the UE is in a radio resource control (RRC) inactive state is provided. The method comprises assigning a cell (re)selection priority level to a plurality of candidate cells based on a core network connection support of each of the plurality of candidate cells; and selecting, in a cell (re)selection procedure, a serving cell from the plurality of candidate cells, the serving cell having a highest cell (re)selection priority level.

In an implementation of the first aspect, assigning the cell (re)selection priority level based on the core network connection support comprises configuring a cell that supports at least a 5G core (5GC) network connection as a default cell type while the UE is searching for suitable cells.

In another implementation of the first aspect, configuring the cell that supports at least the 5GC network connection as the default cell type comprises assigning cells that do not support the 5GC network connection as non-suitable cells.

In yet another implementation of the first aspect, at least one of the non-suitable cells supports an evolved packet core (EPC) network connection.

In another implementation of the first aspect, assigning the cell (re)selection priority level further comprises assigning a higher cell (re)selection priority level to a candidate cell that is associated with a radio access network notification area (RNA) configured to the UE over a candidate cell that is not associated with the RNA configured to the UE.

In another implementation of the first aspect, assigning the cell (re)selection priority level comprises, when measuring a signal strength and a signal quality of a candidate cell, adding a first offset value to the measurement after determining that the candidate cell supports at least a 5GC network connection, and subtracting a second offset value from the measurement when the candidate cell does not support the 5GC network connection.

In another implementation of the first aspect, assigning the cell (re)selection priority level comprises: receiving, from the serving cell, a first frequency priority list, which is provided for UEs that support a 5GC network connection and a second frequency priority list, which is provided for UEs that support only an EPC network connection, wherein the first frequency priority list and the second frequency priority list indicate candidate frequencies and priorities associated with the candidate frequencies for the UEs to search for the candidate cells during the cell (re)selection procedure, and wherein UEs that support the 5GC network connection select the serving cell in the cell (re)selection procedure using the first frequency priority list, and UEs that do not support the 5GC network connection select the serving cell in the cell (re)selection procedure using the second frequency priority list.

In another implementation of the first aspect, assigning the cell (re)selection priority level comprises: receiving, from the serving cell, a frequency carrier priority list indicating a plurality of frequency carriers and corresponding priorities of each frequency carrier in the plurality of frequency carriers; performing an inter-frequency cell (re)selection procedure on the received frequency carrier priority list to find a best candidate cell on more than one frequency carriers; assigning a higher priority level to a first frequency carrier, wherein the first cell, which is the best cell found by the UE on the first frequency carrier, supports a 5GC network connection; and assigning a lower priority level to a second frequency carrier, wherein the second cell, which is the best cell by the UE on the second frequency carrier, does not support the 5GC network connection.

In a second aspect of the present application, a method for a base station that communicates with a user equipment (UE) for cell (re)selection is provided. The method comprises transmitting to the UE a first frequency priority list which is for UEs that support a 5G core (5GC) network connection and a second frequency priority list which is for UEs that support only an evolved packet core (EPC) network connection, wherein the first frequency priority list and the second frequency priority list indicate candidate frequencies and priorities associated with the candidate frequencies for the UEs to search for candidate cells during a cell (re)selection procedure, and wherein if the UE supports the 5GC network connection, the UE selects a new serving cell in the cell (re)selection procedure using the first frequency priority list, and if the UE does not support the 5GC network connection, the UE selects the new serving cell in the cell (re)selection procedure using the second frequency priority list.

In an implementation of the second aspect, the UE that does not support the 5GC network connection comprises a UE that supports the EPC network connection.

In another implementation of the second aspect, in the first frequency priority list, a first candidate cell that is associated with a radio access network notification area (RNA) configured to the UE, has a higher cell (re)selection priority level over a second candidate cell that is not associated with the RNA configured to the UE.

In a third aspect of the present application, a method for a base station that communicates with a user equipment (UE) for cell (re)selection is provided. The method comprises sending to the UE a first offset value and a second offset value to be used by the UE when the UE measures a signal strength and a signal quality of a candidate cell in a cell (re)selection procedure, wherein the UE adds the first offset value to the measurement after determining that the candidate cell supports at least a 5GC network connection, and the UE subtracts the second offset value from the measurement when the candidate cell does not support the 5GC network connection.

In an implementation of the third aspect, the candidate cell that does not support the 5GC network connection comprises a candidate cell that supports an EPC network connection.

In a fourth aspect of the present application, a UE in an RRC inactive state is provided. The UE comprises one or more non-transitory computer-readable media having computer-executable instructions embodied thereon; and at least one processor coupled to the one or more non-transitory computer-readable media, and configured to execute the computer-executable instructions to: assign a cell (re)selection priority level to a plurality of candidate cells based on a core network connection support of each of the plurality of candidate cells; and select, in a cell (re)selection procedure, a serving cell from the plurality of candidate cells, the serving cell having a highest cell (re)selection priority level.

In an implementation of the fourth aspect, the computer-executable instructions to assign the cell (re)selection priority level based on the core network connection support comprise computer-executable instructions to configure a cell that supports at least a 5G core (5GC) network connection as a default cell type while the UE is searching for suitable cells.

In another implementation of the fourth aspect, the computer-executable instructions to configure the cell that supports at least the 5GC network connection as the default cell type comprise computer-executable instructions to assign cells that do not support the 5GC network connection as non-suitable cells, wherein at least one of the non-suitable cells supports an evolved packet core (EPC) network connection.

In another implementation of the fourth aspect, the computer-executable instructions to assign the cell (re)selection priority level further comprise computer-executable instructions to assign a higher cell (re)selection priority level to a candidate cell that is associated with a radio access network notification area (RNA) configured to the UE over a candidate cell that is not associated with the RNA configured to the UE.

In another implementation of the fourth aspect, the computer-executable instructions to assign the cell (re)selection priority level comprise computer-executable instructions to, when measuring a signal strength and a signal quality of a candidate cell, add a first offset value to the measurement after determining that the candidate cell supports at least a 5GC network connection, and subtract a second offset value from the measurement when the candidate cell does not support the 5GC network connection.

In another implementation of the fourth aspect, the computer-executable instructions to assign the cell (re)selection priority level comprise computer-executable instructions to: receive, from the serving cell, a frequency carrier priority list indicating a plurality of frequency carriers and corresponding priorities of each frequency carrier in the plurality of frequency carriers; perform an inter-frequency cell (re)selection procedure on the received frequency carrier priority list to find a best candidate cell on more than one frequency carriers; assign a higher priority level to a first frequency carrier, wherein the first cell, which is the best cell found by the UE on the first frequency carrier, supports a 5GC network connection; and assign a lower priority level to a second frequency carrier, wherein the second cell, which is the best cell by the UE on the second frequency carrier, does not support the 5GC network connection.

In another implementation of the fourth aspect, the computer-executable instructions to assign the cell (re)selection priority level comprise computer-executable instructions to: receive, from the serving cell, a first frequency priority list, which is provided for UEs that support a 5GC network connection and a second frequency priority list, which is provided for UEs that support only an EPC network connection, wherein the first frequency priority list and the second frequency priority list indicate candidate frequencies and priorities associated with the candidate frequencies for the UEs to search for the candidate cells during the cell (re)selection procedure, and wherein UEs that support the 5GC network connection select the serving cell in the cell (re)selection procedure using the first frequency priority list, and UEs that do not support the 5GC network connection select the serving cell in the cell (re)selection procedure using the second frequency priority list.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 5 is a table illustrating the configuration a UE may receive through dedicated signaling for prioritizing the LTE/EPC and LTE/5GC cells, according to an example implementation of the present application.

FIG. 6A is a cell (re)selection table illustrating candidate cells being arranged (prioritized) based on the priorities of the operative frequency bands of the candidate cells, according to an example implementation of the present application.

FIG. 6B is the cell (re)selection table of FIG. 6A in which the priorities of the candidate cells are rearranged by the UE based on the core network connection support of the candidate cells, according to an example implementation of the present application.

FIG. 7A is a cell (re)selection table illustrating candidate cells being arranged (prioritized) based on the priorities of the operative frequency bands of the candidate cells, according to an example implementation of the present application.

FIG. 7B is the cell (re)selection table of FIG. 7A in which the priorities of the candidate cells are rearranged by the UE based on the core network connection support of the candidate cells, according to an example implementation of the present application.

FIG. 7C is the cell (re)selection table of FIG. 7A in which the priorities of the candidate cells are rearranged differently compared to FIG. 7B, based on different core network connection support of the candidate cells, according to an example implementation of the present application.

DETAILED DESCRIPTION

Figure 1:
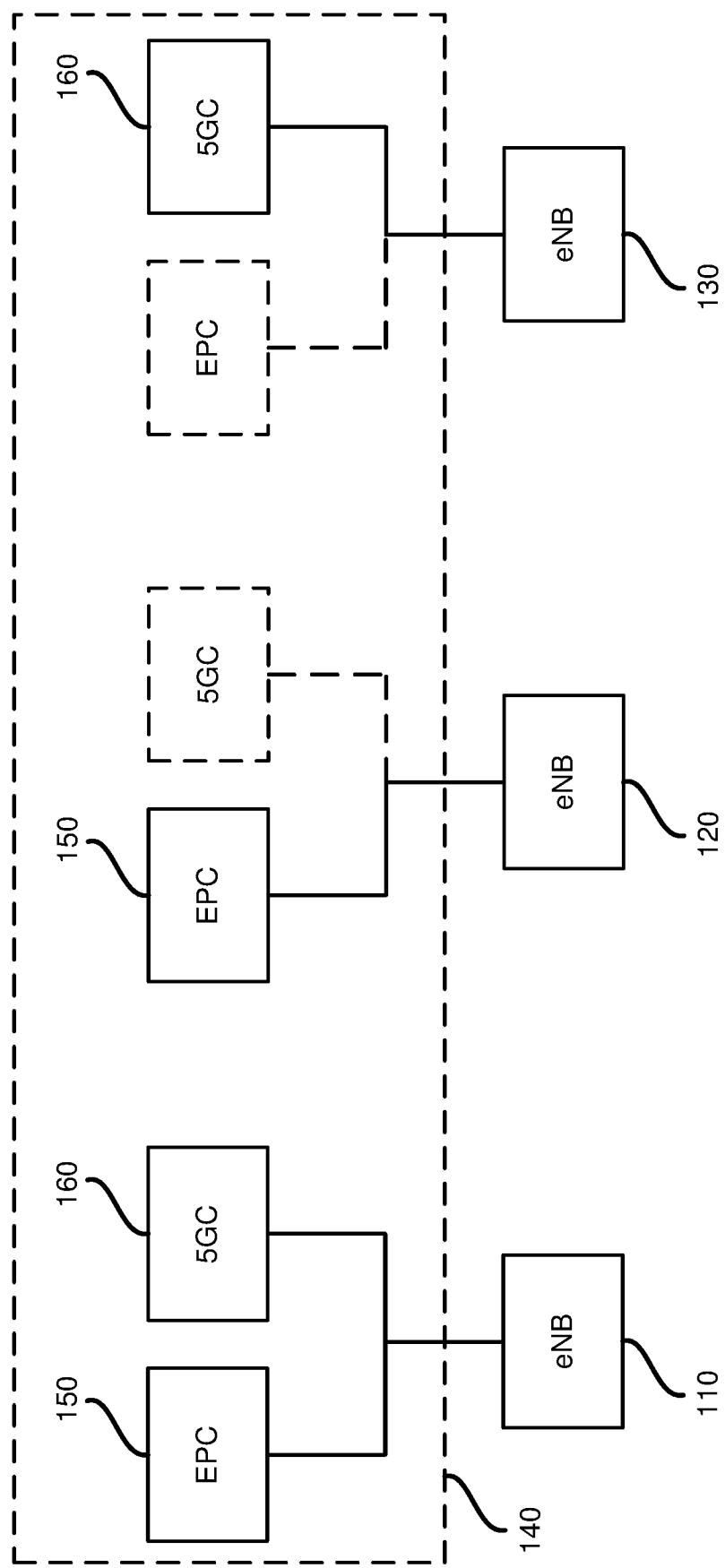
FIG. 1 illustrates different types of CN connections for different candidate cells in a cell (re)selection procedure, according to an example implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), a 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR, and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC (Multi-RAT Dual Connectivity) cases, the primary cell of an MCG or a primary secondary cell of an SCG may be called a special cell (SpCell). So, a PCell may refer to the SpCell of an MCG, while a PSCell may refer to the SpCell of an SCG. An MCG may include a group of serving cells associated with the MN, comprising of the SpCell and optionally one or more secondary cells (SCells). An SCG may include a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

When a user equipment (UE) is switched on, or when the UE attempts to change its Radio Resource Control (RRC) status from an inactive/idle state to an active state (e.g., RRC Connected state), the UE may select (or reselect) a candidate cell (e.g., a suitable cell), based on one or more criteria, such as frequency prioritization rules, S-criteria, R-criteria, etc. Additionally, based on the core network (CN) connectivity, three different types of CN connection may be supported by one or more cells that are candidates for a cell (re)selection procedure performed by the UE.

FIG. 1 illustrates different types of CN connections for different candidate cells in a cell (re)selection procedure, according to an example implementation of the present application. In some types of RANs, such as in E-UTRAN, a cell (e.g., an eNB) may be associated with more than one type of CN 140. For example, as illustrated in FIG. 1, cell 110 may be able to connect to both Evolved Packet Core (EPC) network 150 and 5G Core (5GC) network 160, while cell 120 may be capable of connection to EPC network 150 only, and cell 130 may only support connection to 5GC network 160. Therefore, in a cell (re)selection procedure, a selected cell may be suitable for more than one CN types. The CN types for which the selected cell is suitable may be reported to the Non-Access Stratum (NAS) layer which may select one of the reported CN types to be used for camping (and for a NAS registration procedure). In some of the present embodiments, if the UE finds a more suitable cell (e.g., based on the cell (re)selection criteria), the UE may reselect and camp on the new cell. In some of the present embodiments, if the (re)selected cell is an E-UTRA cell and the UE supports the E-UTRA connection to the 5GC, the CN type(s) for which the cell is suitable may be reported to the NAS layer. The NAS layer may then select one of the CN types.

Figure 2:
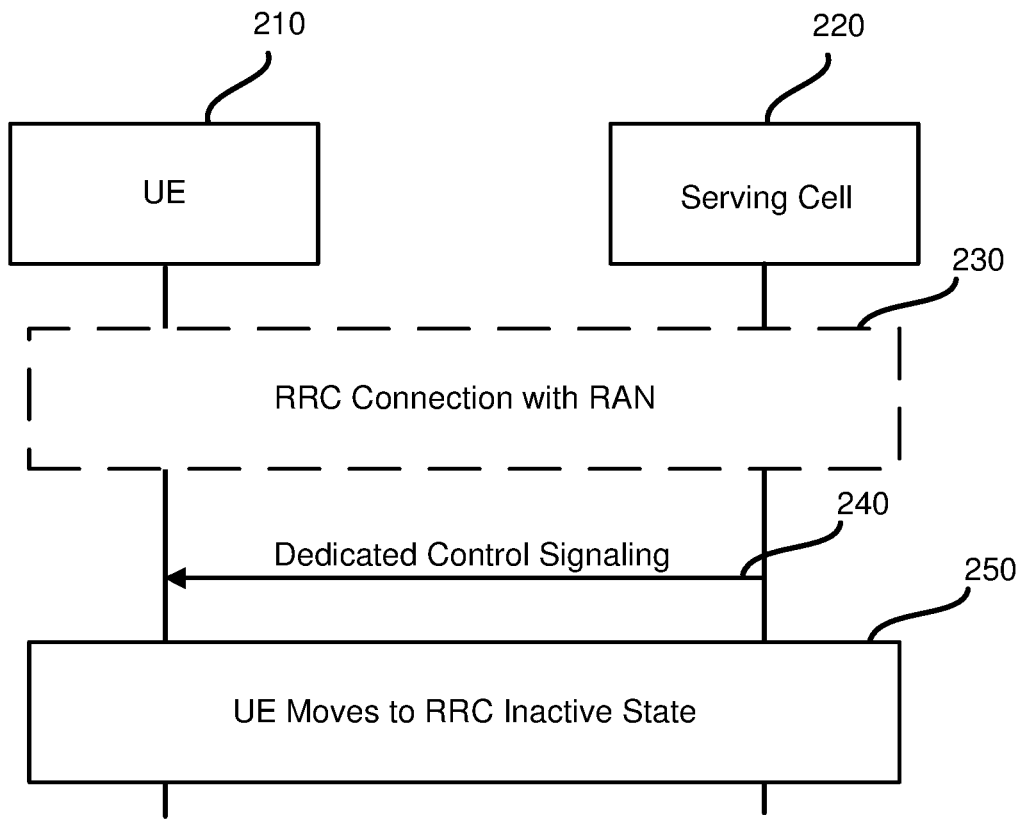
FIG. 2 is a diagram illustrating a UE receiving an instruction from a serving cell to switch from an RRC connected state to an RRC inactive state, according to an example implementation of the present application.

A UE may transition to an RRC inactive state after receiving instructions (e.g., an RRC Connection Release message) form a serving cell that connects to the 5GC network as a backhaul connection. FIG. 2 is a diagram illustrating a UE receiving an instruction from a serving cell to switch from an RRC connected state to an RRC inactive state, according to an example implementation of the present application. As shown in the figure, the UE 210 that has an RRC connected type of connection 230 with the serving cell 220 may receive an RRC connection release message 240 (e.g., through dedicated control signaling). After receiving the message 240, the UE 210 may transition to an RRC inactive type of connection 250 with the serving cell 220 (e.g., the UE 210 may suspend the connection with the serving cell 220, while keeping the RRC connection configuration with the serving RAN and the NAS connection with the serving Core Network).

In some of the present embodiments, a cell (or eNB) that does not support a 5GC network connection (also referred to as an LTE/EPC cell hereinafter) may not support a UE in an RRC inactive state either. Conversely, a cell (or eNB) that supports a 5GC network connection, or supports both 5GC and EPC network connections (also referred to as an LTE/5GC cell hereinafter) may also support a UE in an RRC inactive state. In some of the present embodiments, a UE may determine whether a cell supports the connection to an EPC and/or a 5GC network, based on receiving a broadcasting message from the cell. For example, an LTE/5GC cell may provide an RAN-Area Code (for an RRC inactive state supporting cell) in the system information (SI) in some embodiments. In some examples, an LTE cell may also indicate the supporting CN type (e.g., EPC and/or 5GC) corresponding to each supporting PLMN (Public Land Mobile Network) in the broadcasting system information.

In some of the present embodiments, after a UE selects a serving cell that does not support a 5GC network connection (i.e., an LTE/EPC cell), the UE may enter into an idle state (e.g., the UE may release its UE context/AS layer configuration and inform the UE's NAS). As such, an LTE/EPC cell may be considered as a coverage hole for a UE that is in an RRC inactive state. Some of the present embodiments, therefore, may assign a lower priority to an LTE/EPC cell (e.g., a cell with backhaul connections only to an EPC network) and a higher priority to an LTE/5GC cell (a cell with backhaul connections to at least a 5GC network) during a cell (re)selection procedure.

Figure 3:
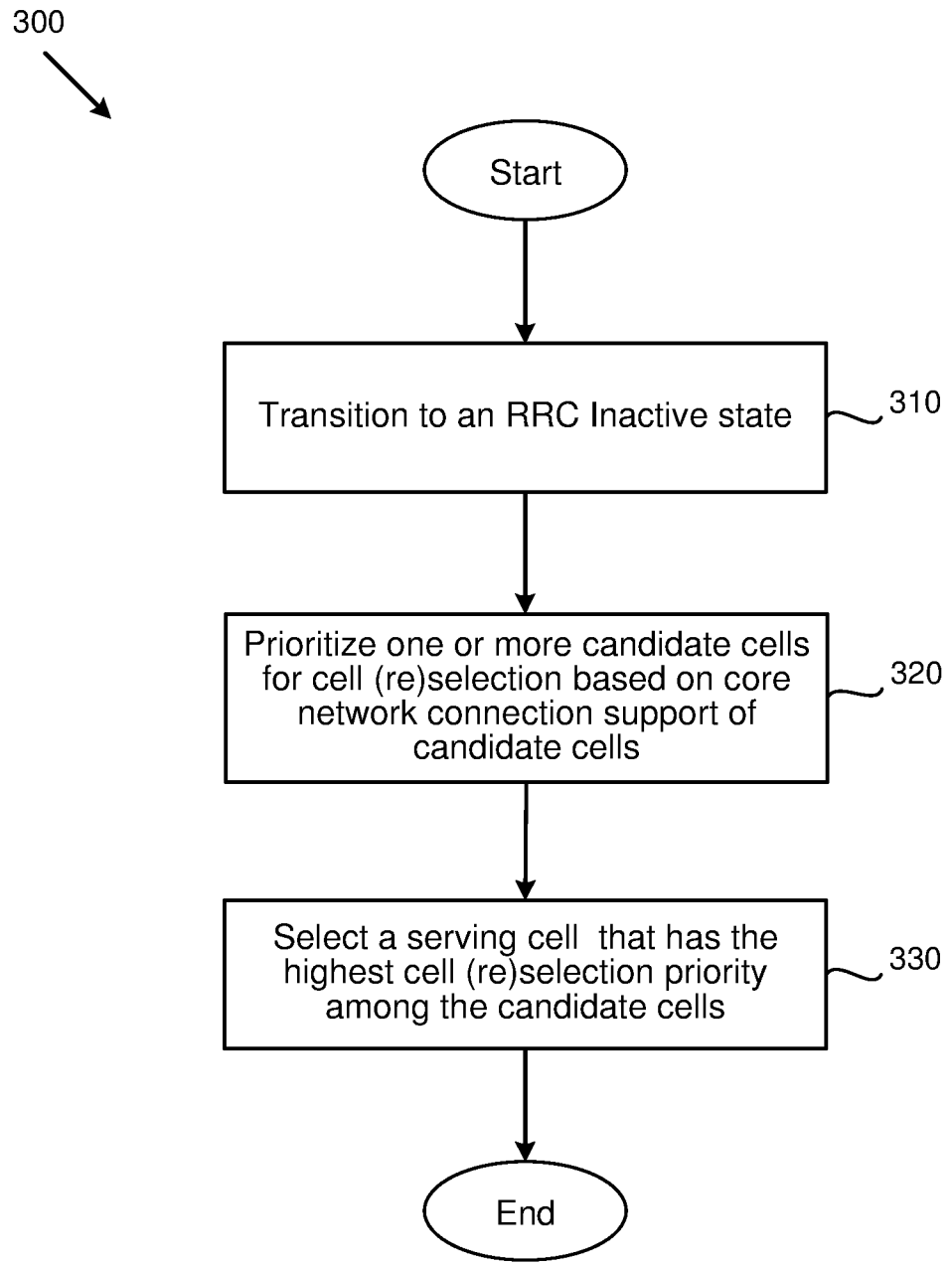
FIG. 3 is a flowchart illustrating a method (or process) performed by a UE for prioritizing the candidate cells and selecting the highest ranked candidate cell, according to an example implementation of the present application.

FIG. 3 is a flowchart illustrating a method (or process) 300 performed by a UE for prioritizing the candidate cells and selecting the highest ranked candidate cell, according to an example implementation of the present application. The process 300 may start at action 310 by the UE transitioning to an RRC inactive state. As described above, a UE may transition to an RRC inactive state after receiving instructions (e.g., an RRC Connection Release message) form a base station (e.g., a serving cell) that connects to the 5GC network as a backhaul connection. That is, a UE that has an RRC connected type of connection with a serving cell may receive an RRC connection release message (e.g., through dedicated control signaling) from the serving cell. After receiving the message RRC connection release message, the UE may transition to the RRC inactive state and suspend the connections with the serving cell, while keeping the connection configuration.

In action 320, while the UE is in an RRC inactive state, the UE may prioritize the different candidate cells for cell (re)selection based on the core network connection support of the candidate cells. For example, the UE may assign a higher priority level to the candidate cells that support connection to a 5GC network. Conversely, the UE may assign a lower priority level to the candidate cells that do not support connection to the 5GC network (e.g., the candidate cell(s) that only connect to an EPC network). Different embodiments for evaluating and ranking the candidate cells based on the candidate cells' core network connection support are described below with reference to FIGS. 5-9.

In action 330, the process 300 may select a serving cell that has the highest ranking in core network connection support among the candidate cells. In some of the present embodiments, the process 300 may select the serving cell when the UE is performing a cell (re)selection procedure (e.g., while the UE is in an RRC inactive state). The process may then end.

Figure 4:
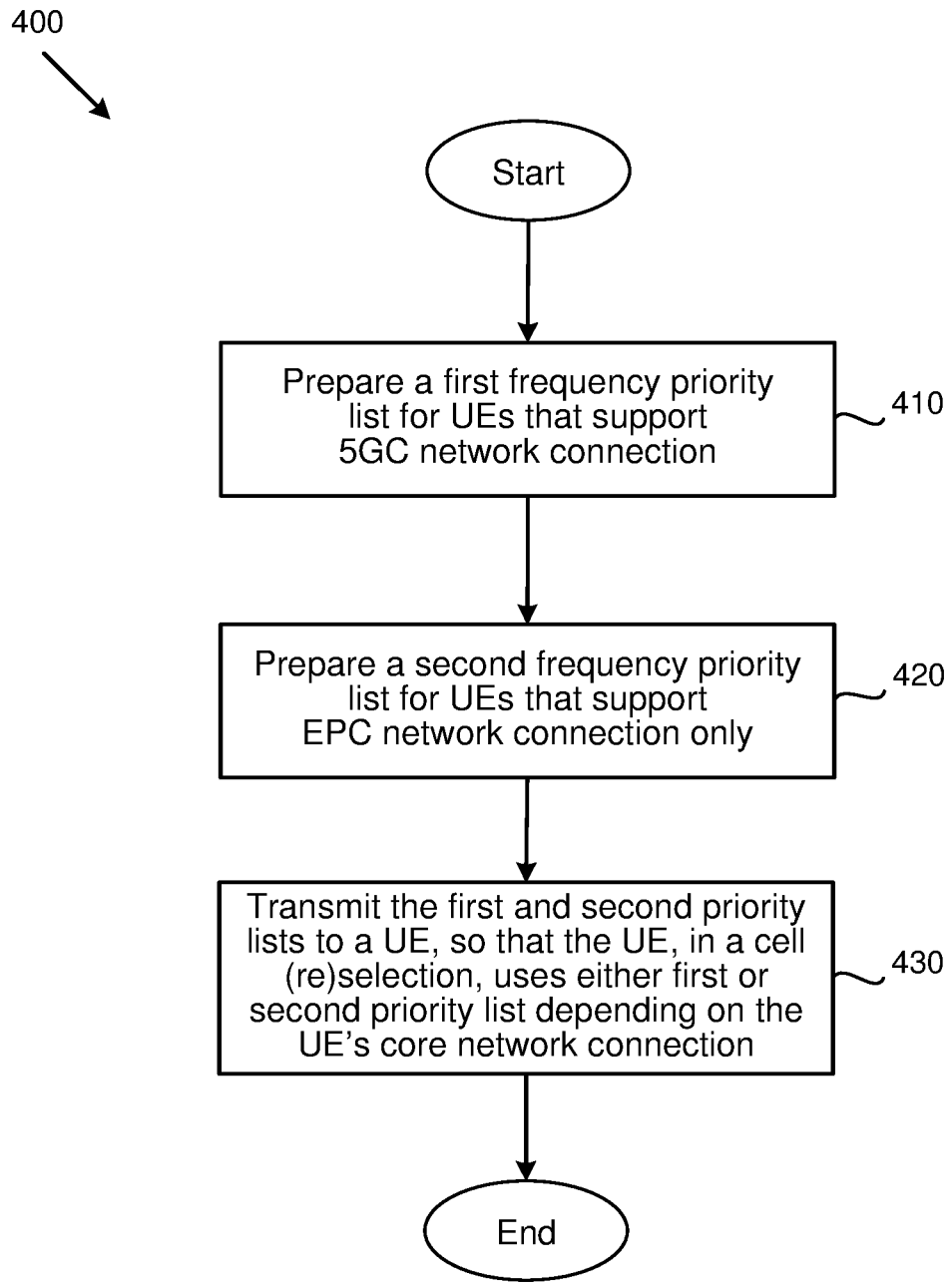
FIG. 4 is a flowchart illustrating a method (or process) performed by a base station for prioritizing the candidate cells for a cell (re)selection procedure performed by a UE, according to an example implementation of the present application.

FIG. 4 is a flowchart illustrating a method (or process) 400 performed by a base station for prioritizing the candidate cells for a cell (re)selection procedure performed by a UE, according to an example implementation of the present application. The process 400 may start at action 410 by preparing a first frequency priority list for UEs that support a 5GC network connection. In action 420, the process 400 may prepare a second frequency priority list for the UEs that support an EPC network connection only. In some of the present embodiments, the first and second frequency priority lists may indicate the candidate frequencies to the UE and the frequencies and priorities that are associated with the candidate frequencies.

In action 420, the process 400 may transmit the first and second priority lists to a UE, so that the UE, in a cell (re)selection procedure, uses either the first priority list, or the second priority list depending on the UE's core network connection. For example, if the UE supports the 5GC network connection, the UE may select a new serving cell in the cell (re)selection procedure using the first frequency priority list. Alternatively, if the UE does not support the 5GC network connection (e.g., supports an EPC network connection), the UE may select a new serving cell in a cell (re)selection procedure using the second frequency priority list. In some aspects of the present embodiments, the first and second frequency priority lists may be transmitted to the UE as a single frequency priority list. The two different priority lists are described in detail below with reference to FIG. 5. After transmitting the first and second frequency priority lists to the UE, the process 400 may end.

As described above, a UE may select a suitable cell based on one or more criteria (e.g., frequency prioritization rules, S-criteria, R-criteria, etc.). For example, a candidate cell may be selected by a UE based on the cells operative frequency band(s). In some of the present embodiments, a UE in an RRC inactive state may be configured with frequency prioritization rules when the network (e.g., the RAN) instructs the UE to move to the RRC inactive state (e.g., through dedicated signaling, such as an RRCConnectionRelease message with suspend configuration). Additionally, in some of the present embodiments, the LTE/5GC cells and the LTE/EPC cells may be prioritized differently for different frequency bands based on the LTE/EPC and LTE/5GC cells being considered as different Radio Access Technologies (RATs) that operate in different frequencies (in the technical specifications), or as the same RAT.

FIG. 5 is a table illustrating the configuration a UE may receive through dedicated signaling for prioritizing the LTE/EPC and LTE/5GC cells, according to an example implementation of the present application. More specifically, the configuration received by the UE may include a table 500 containing a frequency priority list. In the table 500, the LTE/EPC cells and the LTE/5GC cells are considered as different RATs. In addition, the LTE/EPC cells may be deployed on one or more specific frequency bands, which are different from the frequency band(s) on which the LTE/5GC cells may be deployed. In some aspect of the present embodiments, the serving cells may deliver the information that include the specific frequency bands for a specific RAT to the UEs.

In some of the present embodiments, a base station may transmit, to a UE, a first frequency priority list, which is provided for the UEs that support a 5GC network connection, and a second frequency priority list, which is provided for the UEs that support only an EPC network connection. In some of the present embodiments, the first and second frequency priority lists may indicate the candidate frequencies to the UE and the frequencies and priorities that are associated with the candidate frequencies for the UEs to search for candidate cells during a cell (re)selection procedure. In some such embodiments, if the UE supports the 5GC network connection, the UE may select a new serving cell in the cell (re)selection procedure using the first frequency priority list. Alternatively, if the UE does not support the 5GC network connection (e.g., supports an EPC network connection), the UE may select a new serving cell in a cell (re)selection procedure using the second frequency priority list. In some aspects of the present embodiments, the first and second frequency priority lists may be transmitted to the UE as a single frequency priority list.

As shown in FIG. 5, the table 500 may include two additional frequency priority list Information Elements (IEs) 510 and 520, among other IEs 530 that indicate the frequency priority lists for the different RATs (e.g., New Radio, EUTRA, GERAN, etc.). Using the IEs 510 and 520, in some of the present embodiments, a serving cell may indicate to the UE a frequency priority list for an EPC network and a 5GC network, respectively. Specifically, through the IE freqPriorityListEUTRA_EPC 510, the serving cell may indicate (to the UE) the frequency priority list for the EPC network, and using the IE freqPriorityListEUTRA_5GC 520, the serving cell may indicate the frequency priority list for the 5GC network.

The serving cell may transmit the IEs 510 and 520 via downlink control signaling (e.g., through system information or through dedicated RRC signaling). Cells that operate on the EPC frequency priority list (i.e., the cells that are indicated by freqPriorityListEUTRA_EPC 510), in some of the present embodiments, may be configured by an eNB that only supports the EPC network connection. Conversely, cells that operate on the 5GC frequency priority list (i.e., the cells that are indicated by freqPriorityListEUTRA_5GC 520), in some of the present embodiments, may be configured by an eNB that supports at least a 5GC network connection. In some of the present embodiments, a UE may connect to the 5GC network by searching the carrier frequencies on the freqPriorityListEUTRA_5GC 520 and selecting a serving cell.

In some of the present embodiments, the same content of an EUTRA frequency list (i.e., FreqPriorityListEUTRA 540) may be applied to represent the new IEs FreqPriority-EUTRA_EPC 510 and FreqPriorityEUTRA_5GC 520. An example of the content of the EUTRA frequency list is demonstrated and described below:

| FreqPriorityEUTRA ::= | SEQUENCE { |
|---|---|
| carrierFreq | ARFCN-Value, |
| cellReselectionPriority | CellReselectionPriority |
| } | |

Each carrierFreq field in the above example content is represented by an Absolute Radio Frequency Channel Number value (i.e., the ARFCN-Value). Additionally, the cellReselectionPriority field may be an integer having a value within the range of 0 to 7 in some of the present embodiment. The value contained in the cellReselectionPriority field may specify the priority of each corresponding carrierFreq field. In some of the present embodiments, the lower values in the cellReselectionPriority field may indicate the lower priorities of the frequency carriers (e.g., the lower the value is, the lower the priority is) when a UE is determining the priority of each frequency carrier. In some of the present embodiments, the network (e.g., the RAN) may also provide a cellReselectionPriority field for each carrier frequency in other frequency lists for other RATs (e.g., the freqPriorityListGERAN, freqPriorityListNewRadio, etc., as shown in the table 500 of FIG. 5). In one aspect of the present embodiments, a serving cell may provide another IE (e.g., a CellReselectionSubPriority field), in addition to the cellReselectionPriority field, to further indicate a fractional value added to the value of the cellReselectionPriority field in order to obtain a more precise priority of the concerned carrier frequency.

In some of the present embodiments, the RAN may assign lower priorities to the LTE/EPC cells by giving a lower priority to the carrier frequencies in the freqPriorityListEUTRA_EPC 510. For example, the RAN may assign lower values in the cellReselectionPriority field (with/without a CellReselectionSubPriority field) for the carrier frequencies in the freqPriorityListEUTRA_EPC 510, in comparison with the values assigned to the cellReselectionPriority field (with/without a CellReselectionSubPriority field) for other frequency lists (e.g., the freqPriorityListEUTRA_5GC 520). Similarly, in some aspects of the present embodiments, the serving cell may assign a higher value in the cellReselectionPriority field (with/without a CellReselectionSubPriority field) for the carrier frequencies in the freqPriorityListEUTRA_5GC 520, in comparison to the cell reselection priorities of carrier frequencies listed in the downlink control signaling to the UE (e.g., in an RRC Connection Release message).

In some aspects of the present embodiments, a UE in an RRC inactive state may ignore the values of a cellReselectionPriority field and assign a lower priority to the cells indicated by the freqPriorityListEUTRA_EPC (in comparison with freqPriorityListEUTRA_5GC) automatically (e.g., after receiving downlink control signaling from the serving cell). In some such embodiments, the freqPriorityListEUTRA_EPC may indicate the cells implicitly (e.g., by indicating the operative frequency bands of the cells). In some of the present embodiments, the UE may still receive the content of the freqPriorityListEUTRA_EPC (e.g., the cellReselectionPriority field (with/without a CellReselectionSubPriority field)) from the serving cell. For example, the serving cell may broadcast one freqPriorityListEUTRA_EPC in the system information for the cell (re)selection of the UEs that are both in the RRC inactive state and the RRC idle state. However, in some of the present embodiments, an RRC inactive UE may ignore the cellReselectionPriority field (with/without a CellReselectionSubPriority field) in the freqPriorityListEUTRA_EPC and give carrier frequencies in the freqPriorityListEUTRA_EPC a lower priority (in comparison with the priorities of carrier frequencies in the freqPriorityListEUTRA_5GC) without considering the content of the cellReselectionPriority field in the freqPriorityListEUTRA_EPC.

In the above-discussed prioritization methods, the LTE/EPC cells (or eNBs) and the LTE/5GC cell (or eNBs) were considered to belong to different RATs. Some aspects of the present embodiments in which an eNB may operate dispersedly across multiple E-UTRA frequency bands are now discussed. In some of these embodiments, a serving cell may provide only one frequency priority list (e.g., freqPriorityListEUTRA) and the UE may further identify the LTE/EPC cells and the LTE/5GC cells only by reading the system information broadcasted by each cell. For example, the UE may determine whether information associated with the cell access information for a 5GC network (e.g., a 5GC specific RAN Area Code, or a 5GC specific tracking area code) is included in the SI broadcasted by the serving cell.

During an inter-frequency cell (re)selection procedure, the UE may always monitor the higher priority frequency (ies) in order to find a suitable cell (e.g., a cell that fulfils the S-criteria and the UE may obtain a normal service by camping on the suitable cell) for camping. In some of the present embodiments, the priority of each carrier frequency may be determined by the cellReselectionPriority field (with/without the CellReselectionSubPriority field), which is received through downlink control signaling, or through the UE's implementation (e.g., the UE may be configured to follow the sequence of carrier frequency in the given frequency list from high priority to low priority).

In some aspects of the present embodiments, after receiving (e.g., from a serving cell) a frequency carrier priority list that indicates the frequency carriers and the corresponding priorities for each frequency carrier, the UE may perform an inter-frequency cell (re)selection procedure on the received frequency carrier priority list to find the best candidate cell on more than one frequency carrier. The UE of some of the present embodiments may then rearrange the received list based on the core network connection support of the frequency carriers indicated in the list. That is, the UE may assign a higher priority level to a frequency carrier of the list that supports a 5GC network connection, and a lower priority level to a frequency carrier of the list that does not support a 5GC network connection. In other words, an RRC inactive UE may assign a low priority to a carrier frequency in a frequency priority list (e.g., the FreqPriorityListEUTRA), if the best cell (e.g., found by the UE) in that carrier frequency does not support connection to a 5GC network.

FIGS. 6A-6B illustrate rearranging the priorities of different candidate cells in a frequency carrier list received from a base station for a cell (re)selection procedure performed by a UE, according to an example implementation of the present application. Specifically, FIG. 6A is a cell (re)selection table 600 illustrating candidate cells being arranged (prioritized) based on the priorities of the operative frequency bands of the candidate cells, according to an example implementation of the present application. FIG. 6B is the cell (re)selection table of FIG. 6A in which the priorities of the candidate cells are rearranged by the UE based on the core network connection support of the candidate cells, according to an example implementation of the present application.

As illustrated in FIG. 6A, the table 600A may include a first column 610, in which the different carrier frequencies are sorted for a particular frequency priority list, and a second column 620 which may include the corresponding detected cells for each carrier frequency. In some of the present embodiments, the sequence of cells corresponding to each carrier frequency in the columns 620 may be decided by the UE after measuring the signaling strength (and/or quality, such as RSRP and/or RSRQ) of each cell. As shown in the table 600A, a UE may be configured with three different carrier frequencies with three different cell (re) selection priorities (cellReselectionPriority). That is, frequency #a in the table 600A has the first priority, frequency #b has the second priority, and frequency #c has the third and least priority in the FreqPriorityListEUTRA of the table 600.

The UE, as shown in the table 600A, is currently camping on the cell #c1 in the detected cells 650, which is operating on the frequency #c. Also the cell #c1 is connected to a 5GC network. As such, the UE may keep monitoring the frequencies #a and/or #b during the UE's inter-frequency cell (re)selection procedure. The best cell #a1 in the detected cells 630 which operates on the frequency #a (the first priority) supports a connection to the EPC network only, while the next cell #a2 in the detected cells 630 supports a connection to the 5GC network. On the other hand, for carrier frequency #b, the detected cells 640 includes the cell #b1, which supports a connection to the 5GC network, and the cells #b2 and #b3.

As discussed above, the UE, in some aspects of the present embodiments, after receiving and arranging the frequency priority list shown in table 600A, may reconfigure the priorities by assigning higher priorities to the cells that support the 5GC network connection and assigning lower priorities to the cells that do not support the 5GC network connection. Therefore, as shown in the table 600B of FIG. 6B, the UE may assign, to the frequency #a, the lowest priority frequency because the UE, during the cell (re) selection monitoring procedure, may not find the best cell that also supports a connection to the 5GC network in the detected cells 630 for the frequency #a. In addition, both of the frequencies #b and #c may become a higher priority (e.g., the first priority may be assigned to the frequency #b and the second priority may be assigned to the frequency #c) than the frequency #a because the UE may find that the new best cell (i.e., #b1) in the detected cells 640 has connection with the 5GC network for the corresponding carrier frequency and the best cell found by the UE in the frequency #a (among the detected cells 630) does not support 5GC.

In some of the present embodiments, when the UE does not find any best cell that may also have a connection to the 5GC network (in one or more high priority carrier frequencies), the UE may assign a lower priority to the best cell(s) of the one or more high priority carrier frequencies compared to the priority of the operative carrier frequency of the UE's currently camped cell in a cell (re)selection procedure.

FIGS. 7A-7C illustrate rearranging the priorities of different candidate cells in a frequency carrier list during a cell (re)selection procedure, according to an example implementation of the present application. Specifically, FIG. 7A is a cell (re)selection table 700 illustrating candidate cells being arranged (prioritized) based on the priorities of the operative frequency bands of the candidate cells, according to an example implementation of the present application. FIG. 7B is the cell (re)selection table of FIG. 7A in which the priorities of the candidate cells are rearranged by the UE based on the core network connection support of the candidate cells, according to an example implementation of the present application. FIG. 7C is the cell (re)selection table of FIG. 7A in which the priorities of the candidate cells are rearranged differently compared to FIG. 7B, based on different core network connection support of the candidate cells, according to an example implementation of the present application.

The UE, as shown in the table 700A is currently camping on the cell #c1 in the detected cells 750, which is operating on the frequency #c ($3^{rd}$ priority). The best cell #a1 in the detected cells 730, and the best cell #b1 in the detected cells 740 are both connected with the EPC network only. There is also one additional detected cells field 760 for frequency #d, in which no cell is detected yet. When there are multiple high priority carrier frequencies (e.g., the frequencies #a and #b), and none of the best cells associated with these carrier frequencies (e.g., the cells #a1 and #b1) connects to a 5GC network, the UE may reconfigure the frequencies #a and #b to low priority frequencies (compared to the operation carrier frequency of the camped cell).

As shown in FIG. 7B, the frequencies #a and #b associated, respectively, with detected candidate cells #a and #b are below the frequency #c which corresponds to the camped cell #c in table 700B. It should also be noted that before the reconfiguration, the UE may not monitor the Freq.#d because the priority of the Freq.#d is lower than the selected frequency band (i.e., Freq.#c) and the UE may be camping on a suitable cell in the Freq.#c. For frequency priority reconfiguration, the UE may determine the priority of Freq.#d by measuring the suitable cells in the Freq.#d. As shown in table 700B, the priority of Freq.#d may be higher than Freq.#a and Freq.#b if the UE finds the best cell (e.g., the cell#d1) in the Freq.#d connects to the 5GC network.

Additionally, for the carrier frequencies having best cells that are not connected with a 5GC network, the priorities of the frequency bands may still be determined based on the given "cellReselectionPriority" (with/without "CellReselectionSubPriority") in the FreqPriorityListEUTRA, or through the UE's implementation. For example, in table 700B, the priority of the frequency #d is higher than the frequency #a and the frequency #b because the UE has determined that the best cell (e.g., the cell #d1 in the detected cells 760) in the frequency #d supports connection with the 5GC network. In addition, in table 700B, the priority of frequency #a is still higher than the frequency #b. Conversely, in table 700C with reference to FIG. 7C, the priority of frequency #d may be lower than that of the frequency #a and the frequency #b because in this scenario, the UE has determined that the best cell (cell #d1) in frequency #d may not be connected to the 5GC network. Also, in table 700C, the priority of frequency #a, frequency #b, and/or frequency #d may still be determined based on a given "cellReselectionPriority" (with/without "CellReselectionSubPriority") in the FreqPriorityListEUTRA.

In some aspects of the present embodiments, the frequency prioritization may be determined by considering both the core network connection and the RAN Notification Area (RNA). In some of the present embodiments, a UE may assign a higher cell (re)selection priority level to a candidate cell that is within an RNA over a candidate cell that outside the RNA. The RNA may be configured to the UE by a serving cell of the UE when the serving cell is instructing the UE to transition to an RRC inactive state. The network may not update the UE's RNA configuration while the UE is traveling within the RNA. However, when the UE is leaving the coverage of an RNA, the UE may need to connect with the network (e.g., the RAN) again to receive updated RNA configuration. In some of the present embodiments, a UE may identify whether a neighboring cell belongs to the UE's configured RNA by checking the system information broadcasted by each neighboring cell. For example, the UE may consider a neighboring cell to be associated with the UE's configured RNA if the tracking area code and/or the RAN-Area code and/or the cell identity (which are broadcasted by the neighboring cell) match with the RNA configured to the UE. Otherwise, the UE may consider the neighboring cell as being outside the UE's configured RNA.

Figure 8:
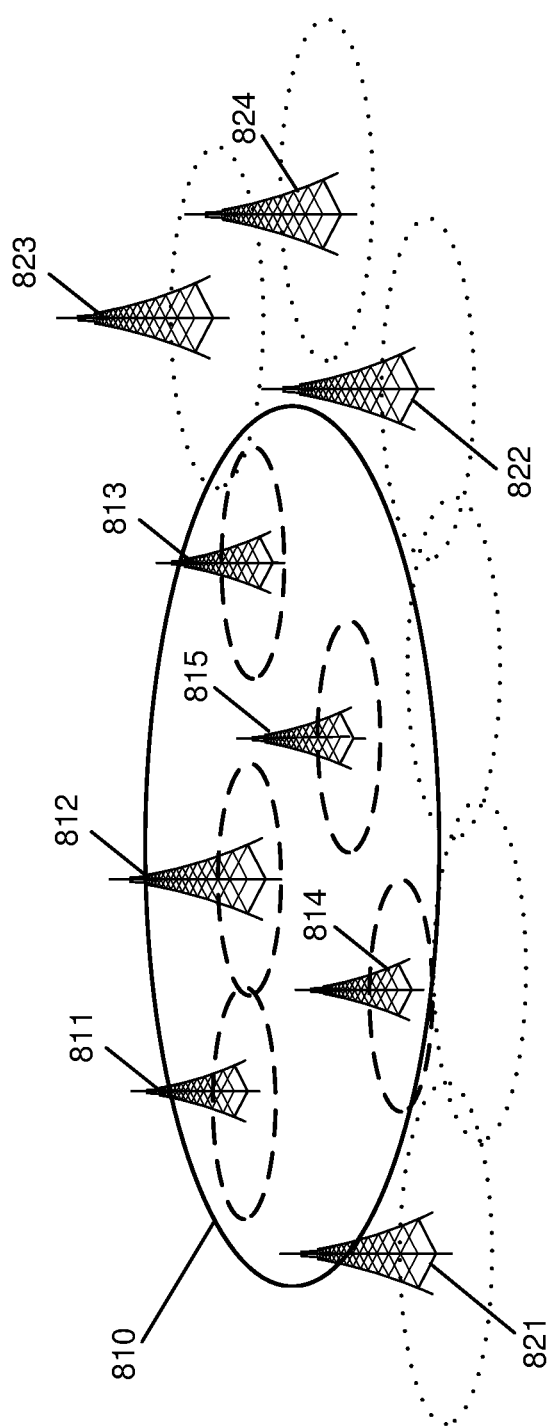
FIG. 8 illustrates several cells within and outside a coverage area associated with an RAN Notification Area (RNA) configured to a UE, according to an example implementation of the present application.

FIG. 8 illustrates several cells within and outside a coverage area associated with an RNA configured to a UE, according to an example implementation of the present application. As shown in the figure, the cells 811-815 are within (or associated with) the configured RNA coverage area 810 configured to the UE, while the cells 821-824 are outside the RNA coverage area 810. In some of the present embodiments, it is desirable to reduce the number of unnecessary RNA updates (e.g., while the UE is moving within the RNA 810 and close to the edges of the RNA 810) in order to achieve power saving at the UE. Some of the present embodiments may prioritize the cells within the RNA coverage area 810 (e.g., the cells 811-815) while a UE in an RRC inactive state performs a cell (re)selection procedure. As such, the cells in the RNA area 810, or the frequencies which the cells within the RNA area 810 occupy, may have higher priorities in the cell (re)selection procedure performed by the UE. As described above, some of the present embodiments may determine the frequency prioritization based on both the core network connection of the neighboring cells and the RNA configuration of the UE.

In some aspects of the present embodiments, a UE may reconfigure the frequency prioritizations using one or more rules defined for (or configured to) the UE. For example, in one aspect of the present embodiments, the UE may assign the first priority level to a carrier frequency for which the associated best cell is within the UE's configured RNA coverage area. In some of the present embodiments, the UE may assign the second priority level to a carrier frequency for which the associated best cell is not within the configured RNA coverage area, but the best cell supports connection to a 5GC network. Conversely, the UE of some such embodiments may assign the third priority level to a carrier frequency for which the associated best cell is neither within the configured RNA coverage area, nor supports connection to the 5GC network. In some of the present embodiments, if a priority category includes more than one carrier frequency, the UE may determine one or more sub-priorities for the carrier frequencies of the priority category by referring to the configurations in the frequency priority list received for a particular RAT (e.g., the FreqPriorityListEUTRA).

In some of the present embodiments, the UE may obtain all or part of the frequency prioritization rules from data received from a base station (e.g., a serving cell). For example, the data received from the base station, in some aspects of the present embodiments, may include, but is not limited to, the broadcasting message(s) (e.g., system information), dedicated signaling (e.g., an RRC Connection Release message), the storage unit (e.g., UMTS Subscriber Identity Module (USIM)), or via specified (defined) descriptions in the technical specification.

As discussed above, after a UE evaluates the frequency prioritizations (e.g., based on a frequency priority list, such as FreqPriorityListEUTRA, and/or based on the core network connection of the candidate cells), the UE may select one carrier frequency and one camped cell among the suitable cells operating on the selected carrier frequency. During a cell (re)selection procedure, a UE may use both of the cell selection RX (or power) level value (i.e., Srxlev) and the cell selection quality value (i.e., Squal) in evaluating the S-criteria and R-criteria for cell (re)selection. For example, the UE may select to camp on a suitable cell, when both the Srxlev and the Squal are greater than 0.

During a measurement triggered for a cell reselection, the UE may not perform intra-frequency measurement or (equal or low priority) inter-frequency or (equal or low priority) inter-RAT frequency measurements when the {Srxlev, Squal} of the serving cell are good enough (e.g., when the Srxlev and the Squal are greater, respectively, than a threshold of current cell's Srxlev ($S_{IntraSearchP}$) and a threshold of current cell's Squal ($S_{IntrasearchQ}$), or when the {Srxlev, Squal} are compared to $S_{nonIntraSearchP}$ and $S_{nonIntrasearchQ}$, which may be configured by the RAN). In contrast, the UE may perform an intra-frequency measurement or (equal or low priority) inter-frequency or (equal or low priority) inter-RAT frequency measurements when the {Srxlev, Squal} are lower than the (predefined) thresholds.

Additionally, a cell reselection procedure for switching to a target cell of a higher priority frequency may be triggered if the target cell fulfils Squal>$Thresh_{X,\ HighQ}$ or Srxlev>$Thresh_{X,\ HighP}$ during a predefined time interval, where the {$Thresh_{X,\ HighQ}$, $Thresh_{X,\ HighP}$} are predefined thresholds. Similarly, a cell reselection procedure for switching to a cell of a lower priority frequency may be triggered if the cell fulfils Squal>$Thresh_{X,\ LowQ}$ or Srxlev>$Thresh_{X,\ LowP}$ during a predefined time interval, where the {$Thresh_{X,\ LowQ}$, $Thresh_{X,\ LowP}$} are predefined thresholds. A cell reselection procedure for switching to an intra-frequency cell or cells operating on equal-priority frequencies may follow the ranking of the R-criteria.

The Srxlev and the Squal in evaluating the S-Criteria may be calculated based on the following formulas:

$$Srxlev = Q_{rxlevmeas} - (Q_{rxlevmin} + Q_{rxlevminoffset}) - P\text{compensation} - Q\text{offset}_{temp}$$

$$Squal = Q_{qualmeas} - (Q_{qualmin} + Q_{qualminoffset}) - Q\text{offset}_{temp}$$

In the above equations, the $Q\text{offset}_{temp}$ parameter is an offset that temporarily applies to a cell. The $Q_{rxlevmeas}$ parameter is a measured cell's RX level value (e.g., Reference Signal Received Power, RSRP). The $Q_{qualmeas}$ parameter is a measured cell's quality value (e.g., Reference Signal Received Quality, RSRQ). The $Q_{rxlevmin}$ parameter is a minimum required RX level in the cell (dBm). The $Q_{qualmin}$ parameter is a minimum required quality level in the cell (dB). The $Q_{rxlevminoffset}$ parameter is an offset to the signaled $Q_{rxlevmin}$ taken into account in the Srxlev evaluation as a result of a periodic search for a higher priority PLMN while camped normally in a VPLMN (Visiting PLMN). The $Q_{qualminoffset}$ parameter is an offset to the signaled $Q_{qualmin}$ taken into account in the Squal evaluation as a result of a periodic search for a higher priority PLMN while camped normally in a VPLMN. If the UE supports the additionalPmax in the NS-PmaxList, the Pcompensation parameter may be calculated by:
if present, in SIB1, SIB3 and SIB5, $$\max(P_{EMAX1} - P_{PowerClass}, 0) - (\min(P_{EMAX2}, P_{PowerClass}) - \min(P_{EMAX1}, P_{PowerClass}))\ (\text{dB});$$

else if $P_{PowerClass}$ is 14 dBm:

$$\max(P_{EMAX1} - (P\text{PowerClass} - P\text{offset}), 0)\ (\text{dB})$$

else:

$$\max(P_{EMAX1} - P_{PowerClass}, 0)\ (\text{dB})$$

In the above equations, the $P_{EMAX1}$, $P_{EMAX2}$ parameters are maximum TX power level a UE may use when transmitting on the uplink in the cell (dBm). The $P_{EMAX1}$ and $P_{EMAX2}$ parameters may be obtained from the p-Max and the NS-PmaxList respectively in SIB1, SIB3 and SIB5. The $P_{PowerClass}$ parameter is a maximum RF output power of the UE (dBm) according to the UE power class. Poffset specifies the offset for 14 dBm power class for BL (Bandwidth reduced Low complexity) or NB-IoT (Narrow Band-Internet of Things) UE.

As described above, when a UE is searching for the camped cells in one selected carrier frequency, a cell may be determined as a suitable cell to the UE if the Srxlev>0 and the Squal>0. The UE may select one camped cell among the suitable cell(s). In order to limit the number of needed measurements, the UE may choose not to perform the intra-frequency measurements if the serving cell fulfils Srxlev>$S_{IntraSearchP}$ and Squal>$S_{IntrasearchQ}$. Additionally, if the serving cell fulfils Srxlev>$S_{nonIntraSearchP}$ and Squal>$S_{nonIntrasearchQ}$, the UE may choose not to perform the measurements for the E-UTRAN inter-frequencies or inter-RAT frequency cells of equal or lower priority.

The cell-ranking criterion $R_s$ for a serving cell and $R_n$ for the neighboring cells in evaluating the R-criteria may be calculated based on the following formulas.

$$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM}$$

In the above equations, the $Q_{meas}$ parameter is an RSRP measurement quantity used in the cell reselections. The Qoffset parameter, in the intra-frequency, equals to $Q\text{offset}_{s,n}$, if the $Q\text{offset}_{s,n}$ is valid, otherwise this parameter equals to zero. The Qoffset parameter, in the inter-frequency, except for the NB-IoT, equals to the $Q\text{offset}_{s,n}$ plus the $Q\text{offset}_{frequency}$, if the $Q\text{offset}_{s,n}$ is valid, otherwise this parameter equals to $Q\text{offset}_{frequency}$. $Q\text{offset}_{frequency}$ is a frequency specific offset for equal priority E-UTRAN frequencies (equal priority with the E-UTRAN frequency of the camped cell). The Qoffset parameter, in the NB-IoT, equals to the $Q\text{offsetDedicated}_{frequency}$ for any frequency other than the frequency of the dedicated frequency offset, if the $Q\text{offsetDedicated}_{frequency}$ is valid, otherwise this parameter equals to the $Q\text{offset}_{frequency}$ (if the QoffsetDedicated$_{frequency}$ is valid and the $Q\text{offset}_{frequency}$ is not used). The $Q\text{offset}_{temp}$ parameter is an offset temporarily applied to a cell. Finally, the $Q\text{offset}_{SCPTM}$ parameter is an offset temporarily applied to an SC-PTM (Single-cell Point-to-Multipoint) frequency, such that the offset is applied to all cells on the SC-PTM frequency. If the $Q\text{offset}_{SCPTM}$ parameter is valid, the Qoffset for inter-frequency neighboring cells may not be used. Furthermore, it should be noted that the UE may perform a ranking for all of the cells that fulfil the cell selection's S-criteria. The cells may be ranked according to the R-criteria described above, deriving the $Q_{meas,n}$ and the $Q_{meas,s}$, and then calculating the R values (e.g., $R_s$ and $R_n$ values) using the averaged RSRP results. When a cell is ranked as the best cell, the UE may perform a cell reselection procedure to switch to that cell.

Some of the present embodiments may modify the S-criteria and the R-criteria (as described above) to allow a UE that is in an RRC inactive state to determine more weight for cells that support connection to a 5GC network, compared to cells that do not support the 5GC network connection (e.g., cells that support connection to an EPC network only). In some aspects of the present embodiments, the UE may use one or more offset values (e.g., configured to the UE by a serving cell) when evaluating an S-criteria and/or an R-criteria. The UE of some such embodiments, when measuring the signal strength (or power) and/or signal quality of a candidate cell in a cell (re)selection procedure, may add a first offset value to the measurement after determining that the candidate cell supports at least a 5GC network connection. Conversely, the UE may subtract a second offset value (which maybe the same as, or different from, the first offset value) from the measurement when the UE determines that the candidate cell does not support the 5GC network connection.

In some of the present embodiments, the Srxlev and Squal in evaluating the modified S-Criteria (e.g., the S-criteria_5GC) may be calculated based on the following formulas:

$$Srxlev = Q_{rxlevmeas} - (Q_{rxlevmin} + Q_{rxlevminoffset}) - Pcompensation - Qoffset_{temp} + Pcompensation\_5GC$$

$$Squal = Q_{qualmeas} - (Q_{qualmin} + Q_{qualminoffset}) - Qoffset_{temp} + Qcompensation\_5GC$$

All of the parameters in the above equations are described above except for the two new parameters Pcompensation_5GC and Qcompensation_5GC. The Pcompensation_5GC parameter indicates an offset taken into account in evaluating the S-criteria_5GC (i.e., the Srxlev calculation) when the cell has a connection with the 5GC network, while the Qcompensation_5GC parameter indicates an offset taken into account in evaluating the S-criteria_5GC (i.e., the Squal calculation) when the cell has a connection with the 5GC network. In some of the present embodiments, both of the Pcompensation_5GC and Qcompensation_5GC may be positive values.

In some of the present embodiments, an RRC inactive UE may evaluate a serving/neighboring cell by applying the S-criteria_5GC if the cell is determined to have a connection to the 5GC network. In contrast, an RRC inactive UE may evaluate a neighboring cell by applying the conventional S-criteria (as described above) when the neighboring cell in determined to only have a connection to the EPC network. In some of the present embodiments, the UE may obtain all or part of the parameter(s) of the S-criteria_5GC from the broadcasting message (e.g., system information), dedicated signaling (e.g., RRC Connection Release message), or storage unit (e.g., USIM) received from a base station, or via specified values in the technical specifications.

In some of the present embodiments, a UE may calculate the {Srxlev, Squal} for the neighboring cells that support connection only to the EPC network by evaluating a modified S-criteria (e.g., the S-criteria_EPC) as demonstrated below:

$$Srxlev = Q_{rxlevmeas} - (Q_{rxlevmin} + Q_{rxlevminoffset}) - Pcompensation - Qoffset_{temp} - Pcompensation\_EPC$$

$$Squal = Q_{qualmeas} - (Q_{qualmin} + Q_{qualminoffset}) - Qoffset_{temp} - Qcompensation\_EPC$$

The two new parameters Pcompensation_EPC and Qcompensation_EPC are offsets taken into account in evaluating the S-criteria_EPC (e.g., the Srxlev and Squal calculations) when the cell only connects with the EPC network. By applying the S-criteria_EPC, the UE may assign lower priority when evaluating the cells that only connect to the EPC network. In some of the present embodiments, both of the Pcompensation_EPC and Qcompensation_EPC parameters may be positive values.

In some of the present embodiments, an RRC inactive UE may evaluate a neighboring cell by applying the S-criteria_EPC if the neighboring cell is determined to have a connection to the EPC network only. In some of the present embodiments, an RRC inactive UE may evaluate the serving cell by applying the conventional S-criteria or by applying S-criteria5GC. In some of the present embodiments, the UE may obtain all or part of the parameter(s) of the S-criteria_EPC from the broadcasting message (e.g., system information), dedicated signaling (e.g., RRC Connection Release message), or storage unit (e.g., USIM) received from a base station, or via specified values in the technical specifications.

In some aspects of the present embodiments, the above-described S-criteria_EPC may be jointly applied with the above-described S-criteria_5GC. As such, a UE may derive the {Srxlev, Squal} of a serving cell (that connects with the 5GC network) and the neighboring cells that connect with the 5GC network by applying the S-criteria_5GC. In contrast, the UE may derive the {Srxlev, Squal} of one or more neighboring cells that connect only with the EPC network by applying the S-criteria_EPC.

In some other aspects of the present embodiments, the modified S-criteria_EPC may be jointly applied with the conventional S-criteria. As such, a UE may derive the {Srxlev, Squal} of a serving cell (that connects with a 5GC network) and the neighboring cells which have connection with the 5GC network, by applying the conventional S-criteria. In contrast, the UE may derive the {Srxlev, Squal} of the neighboring cells which connect only with the EPC network, by applying the modified S-criteria_EPC. In some other aspects of the present embodiments, the modified S-criteria_5GC may be jointly applied with the conventional S-criteria. As such, a UE may derive the {Srxlev, Squal} of a serving cell (that connects with a 5GC network) and the neighboring cells which have connection with the 5GC network, by applying the proposed 5-criteria_5GC. In contrast, the UE may derive the {Srxlev, Squal} of the neighboring cells which connect only with the EPC network, by applying the conventional S-criteria.

For a UE that is in an RRC inactive state, in some of the present embodiments, the S-criteria_EPC may not be applied to a camped cell because the UE may transition to an RRC idle state immediately after the UE camps on a cell that has connection with the EPC network only. In addition, the UE may not apply the S-criteria_EPC after the UE transitions to the RRC idle state. In some aspects of the present embodiments, the S-criteria_5GC may be applied to both of the camped cell and the neighboring cells that have connection with the 5GC network. Additionally, the Srxlev and Squal values of a camped cell may be applied for measurement triggering. Therefore, the S-criteri_5GC, in some of the present embodiments, may influence the UE's behavior even more when a measurement is triggered (to enable the UE to stay on a camped cell that has connection with the 5GC network for a longer time).

Similar to the S-criteria_EPC and S-criteria_5GC, in some of the present embodiments, new R-criteria_EPC and R-criteria_5GC may be used for an RRC inactive UE to perform cell rankings. The cell-ranking criteria for the serving cell and/or neighboring cells in evaluating a modified R-criteria (e.g., R-criteria_EPC) may be calculated based on the following formulas.

$$R_s = Q_{meas,s} + Q_{Hyst} - Qoffset_{temp} + Qoffset_{SCPTM}$$

$$R_n = Q_{meas,n} - Qoffset\_EPC - Qoffset_{temp} + Qoffset_{SCPTM}$$

The cell-ranking criterion $R_s$ may be used for a serving cell, while the criterion $R_n$ may be used for neighboring cells if the neighboring cells have connection only to the EPC network. In some of the present embodiments, a UE may apply the above R-criteria_EPC to evaluate (or rank) a neighboring cell. As illustrated, in calculating the $R_n$, a new offset parameter (i.e., the Qoffset_EPC parameter) is used for the neighboring cells that connect only to the EPC network. The Qoffset_EPC parameter is an offset taken into account in evaluating the R-criteria_EPC. The Qoffset_EPC parameter may be a positive value in order to give a lower weight (or priority) to the neighboring cells that only have connection with the EPC network. A UE may perform the ranking procedure for all cells that fulfil the cell selection S-criteria or the S-criteria_EPC/S-criteria_5GC. The cells may be ranked according to the R-criteria_EPC, deriving the $Q_{meas,n}$ and the $Q_{meas,s}$, and calculating the $\{R_s, R_n\}$ values using the averaged RSRP results. In some of the present embodiments, if a cell is ranked as the best cell, the UE may perform a cell reselection procedure to switch to the best-ranked cell.

Some of the present embodiments may perform an R-criteria_5GC ranking by calculating the rankings of the serving cell and the neighboring cells based on the following formulas:

$$R_s = Q_{meas,s} + Q_{Hyst} + Q\text{offset\_5GC} + Q\text{offset}_{SCPTM}$$

$$R_n = Q_{meas,n} + Q\text{offset\_5GC} - Q\text{offset}_{temp} + Q\text{offset}_{SCPTM}$$

In the above equations, the cell-ranking criterion $R_s$ may be used for a serving cell, while the criterion $R_n$ may be used for the neighboring cells if the neighboring cells have connection to the 5GC network. In some of the present embodiments, the Qoffset_5GC parameter is an offset taken into account in evaluating the R-criteria_5GC. The Qoffset_5GC parameter may be a positive value in order to give a higher weight (or priority) to the neighboring cells that have connection with the 5GC network. A UE may perform the ranking procedure for all cells that fulfil the cell selection S-criteria or the S-criteria_EPC/S-criteria_5GC. The cells may be ranked according to the R-criteria_5GC, deriving the $Q_{meas,n}$ and the $Q_{meas,s}$, and calculating the $\{R_s, R_n\}$ values using the averaged RSRP results. If a cell is ranked as the best cell, the UE may perform a cell reselection procedure to switch to the best-ranked cell. Additionally, in some of the present embodiments, a UE may apply the R-criteria/R-criteria_5GC/R-criteria_EPC alone, or in combination with each other, in order to evaluate (or rank) the serving cells and/or the neighboring cells.

Some of the present embodiments may prioritize (or rank) the candidate cells by jointly considering the candidate cells' core network connection and the RNA configuration of the UE. For example, in some aspects of the present embodiments, after a UE determines the frequency prioritization (e.g., based on the FreqPriorityListEUTRA and/or core network connection of the cells), the UE may select one frequency band and one camped cell among the suitable cells the UE finds in the selected frequency band. In some of the present embodiments, an S-criteria_RNA configuration may be configured to an RRC inactive UE to prioritize cells in the configured RNA when the UE performs a cell (re)selection procedure. In some such embodiments, a cell that is within the configured RNA coverage area is ranked higher during the cell (re)selection procedure.

In some of the present embodiments, the Srxlev and Squal in evaluating the modified S-Criteria (e.g., the S-criteria_RNA) may be calculated based on the following formulas:

$$Srxlev = Q_{rxlevmeas} - (Q_{rxlevmin} + Q_{rxlevminoffset}) - P\text{compensation} - Q\text{offset}_{temp} + P\text{compensation\_RNA}$$

$$Squal = Q_{qualmeas} - (Q_{qualmin} + Q_{qualminoffset}) - Q\text{offset}_{temp} + Q\text{compensation\_RNA}$$

The Pcompensation_RNA parameter indicates an offset taken into account in evaluating the S-criteria_RNA (i.e., the Srxlev calculation) when the cell belongs to the configured RNA, while the Qcompensation_RNA parameter indicates an offset taken into account in evaluating the S-criteria_RNA (i.e., the Squal calculation) when the cell belongs to the configured RNA. In some of the present embodiments, both of the Pcompensation_RNA and Qcompensation_RNA parameters may be positive values. In some of the present embodiments, an RRC inactive UE may evaluate a neighboring cell by applying the S-criteria_RNA if the neighboring cell belongs to the configured RNA. The RRC inactive UE may also evaluate the serving cell by applying the S-criteria_RNA if the serving cell belongs to the configured RNA. Additionally, a UE may obtain all or part of the parameter(s) of S-criteria_RNA through a broadcasting message (e.g., system information), dedicated signaling (e.g., an RRC Connection Release message), the storage unit (e.g., USIM), or via specified values in the technical specifications.

In some of the present embodiments, a UE may apply different criteria to different types of cells based on the different rules defined for (or configured to) the UE. For example, an RRC inactive UE may apply the S-criteria_RNA to evaluate the serving cell/neighboring cell(s) if the serving cell/neighboring cell(s) belong to the UE's configured RNA. Conversely, an RRC inactive UE may apply the S-criteria_5GC to evaluate the serving cell/neighboring cell(s) if the serving cell/neighboring cell(s) do not belong to the configured RNA, but do have a backhaul connection with the 5GC network. Additionally, the UE may apply the S-criteria_EPC to evaluate a neighboring cell(s) if the neighboring cell(s) does not belong to the configured RNA nor has a backhaul connection with the 5GC network. In some aspects of the present embodiments, the aforementioned configured rules may be merged as one general S-criteria rule, for which the formulas for calculating the Srxlev and the Squal of each cell may be determined based on the features of the cell (e.g., being within or out of the configured RNA coverage, having connection with the 5GC network, etc.).

For example, in some of the present embodiments, for the camped/neighboring cells that belong to the UE's configured RNA, the UE may apply the S-criteria_RNA to calculate the {Srxlev, Squal} values of the camped cell. In addition, the UE may decide whether to trigger the measurements based on the calculated {Srxlev, Squal} values of the camped cell. In some such embodiments, if one neighboring cell does not belong to the UE's configured RNA (e.g., the tracking area code and/or the RAN-Area Code and/or the cell identity, which are broadcasted by the neighboring cell, does not match the configured RNA stored at the UE), but have a connection with the 5GC network, the UE may determine whether the neighboring cell is a suitable cell by applying the S-criteria_5GC. However, if the neighboring cell is neither in the UE's configured RNA nor has a connection with 5GC network, the UE may determine whether the neighboring cell is a suitable cell by applying the S-criteria_EPC.

As another example, if a UE camps on a cell that is outside the UE's configured RNA coverage, but has a connection with the 5GC network, and the UE is temporally barred to access the cell (e.g., by following the access control parameters provided by the camped cell), the UE may apply the S-criteria_5GC to calculate the {Srxlev, Squal} values of the camped cell. The UE may obtain all or part of the above-described rules by receiving a broadcasting message (e.g., system information), dedicated signaling (e.g., an RRC Connection Release message), by the storage unit (e.g., USIM), or by the specified descriptions in the technical specifications.

In some of the present embodiments, a modified R-criteria (e.g., an R-criteria_RNA) may be configured to an RRC inactive UE to prioritize the cells in the configured RNA when the UE performs a cell (re)selection procedure. Using the rankings in the R-criteria_RNA, the cells within the configured RNA may be ranked higher during a cell (re) selection.

Some of the present embodiments may evaluate the R-criteria_RNA ranking by calculating the rankings of the serving cell and the neighboring cells based on the following formulas:

$$R_s = Q_{meas,s} + Q_{Hyst} + Q\text{offset\_RNA} + Q\text{offset}_{SCPTM}$$

$$R_n = Q_{meas,n} + Q\text{offset\_RNA} - Q\text{offset}_{temp} + Q\text{offset}_{SCPTM}$$

In the above equations, the cell-ranking criterion $R_s$ may be used for a serving cell if the serving cell belongs to the configured RNA, while the criterion $R_n$ may be used for the neighboring cells if the neighboring cells belong to the configured RNA. In some of the present embodiments, the Qoffset_RNA parameter is an offset taken into account in evaluating the R-criteria_RNA. The Qoffset_RNA parameter may be a positive value in order to give a higher weight (or priority) to the candidate cells that are associated with the UE's configured RNA. Additionally, a UE may obtain all or part of the parameter(s) of R-criteria_RNA through a broadcasting message (e.g., system information), dedicated signaling (e.g., an RRC Connection Release message), the storage unit (e.g., USIM), or via specified values in the technical specifications.

In some of the present embodiments, a UE may apply different criteria to different types of cells based on the different rules defined for (or configured to) the UE. For example, an RRC inactive UE may apply the R-criteria_RNA to evaluate the serving cell/neighboring cell(s) if the serving cell/neighboring cell(s) belong to the UE's configured RNA. Conversely, an RRC inactive UE may apply the R-criteria_5GC to evaluate the serving cell/neighboring cell(s) if the serving cell/neighboring cell(s) do not belong to the configured RNA, but do have a backhaul connection with the 5GC network. Additionally, a UE may camp on the "best cell" (e.g., calculated based on the aforementioned rules according to the type of the cell) on a corresponding frequency as the result of performing a cell (re)selection procedure. In some of the present embodiments, a UE may apply one or more of the above-mentioned rules to evaluate the R-value (e.g., $R_s$ and $R_n$ values) of each cell based on the cell's type (e.g., being within or outside an RNA coverage area, having a connection with the 5GC network, etc.). Additionally, the UE may obtain all or part of the above-described rules by receiving a broadcasting message (e.g., system information), dedicated signaling (e.g., an RRC Connection Release message), by the storage unit (e.g., USIM), or by the specified descriptions in the technical specifications.

Figure 9:
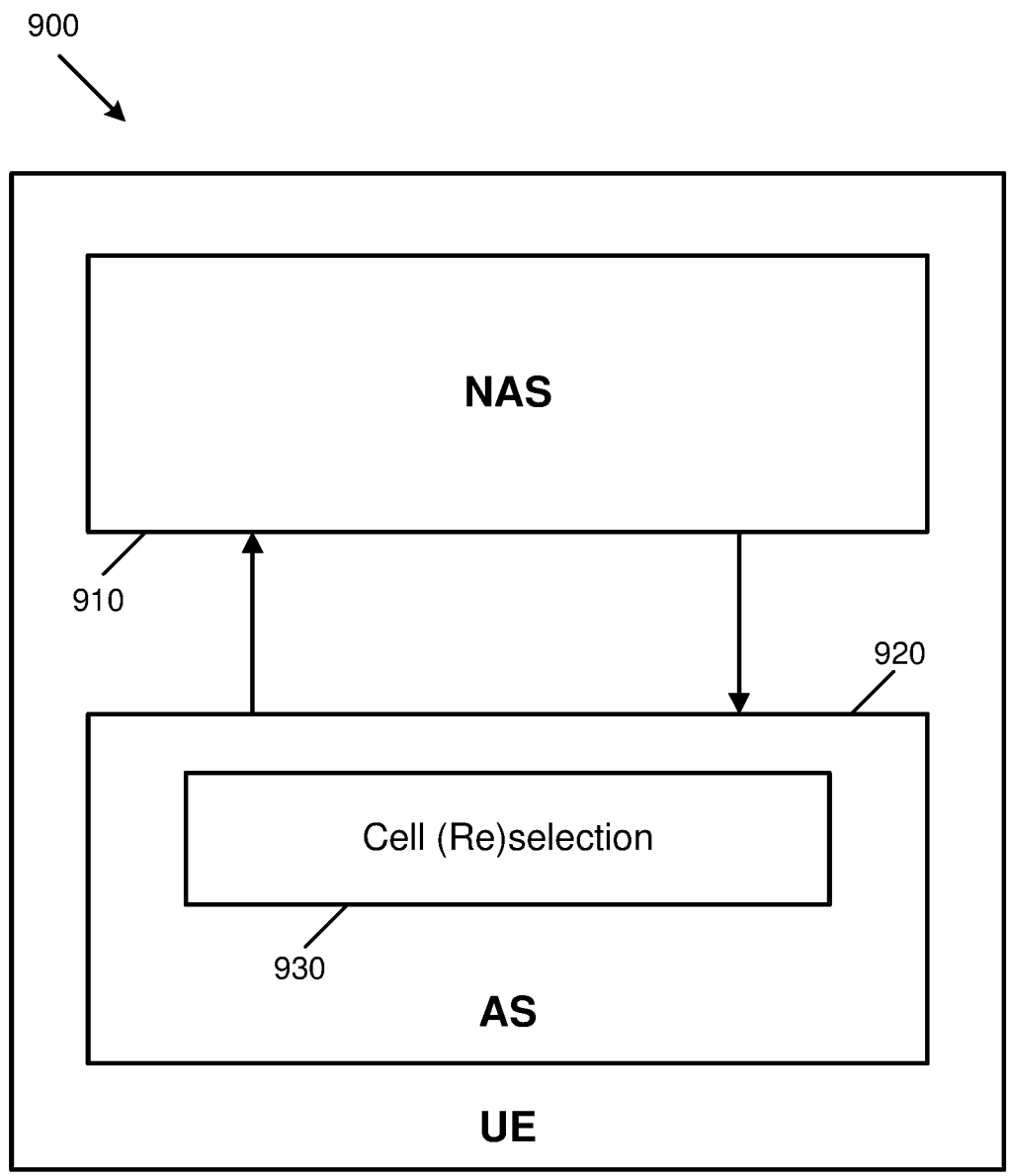
FIG. 9 is a block diagram illustrating an upper layer in the network stack of a UE providing the cell (re)selections prioritization rules, according to an example implementation of the present application.

In the above described embodiments, frequency prioritization and/or cell prioritization rules for the UEs that are in an RRC inactive state were described. In some other aspects of the present embodiments, the frequency prioritization rules and the cell prioritization rules for a cell (re)selection procedure may be determined based on the instructions received from an upper layer in the network stack of the UE. FIG. 9 is a block diagram illustrating an upper layer in the network stack of a UE providing the cell (re)selections prioritization rules, according to an example implementation of the present application.

As shown in FIG. 9, the Non-Access Stratum (NAS) layer 910 of the network stack of the UE 900 may indicate the preferred core network type (e.g., an EPC network or a 5GC network) to the Access Stratum (AS) layer 920 of the UE. As such, the cell (re)selection function 930 executed in the AS layer 920 may apply the proposed frequency prioritization rules/cell prioritization rules if the NAS layer 910 indicates that the 5GC network is preferred during the cell (re) selection procedures. In some other aspects of the present embodiments, the AS layer 920 may set the 5GC network as the default preferred core network type whenever the UE is in an RRC inactive state. In other words, in one aspect of the present embodiments, the UE may apply the frequency/cell prioritization rules described above only when the UE is in an RRC inactive state. Additionally, in another aspect of the present embodiments, a UE may apply all or part of the conventional frequency prioritization rules/S-criteria rules/R-criteria rules (which are also provided by the serving cells or stored at the UE) after the UE transitions to an RRC idle state.

In some of the present embodiments, a suitable cell that supports at least a 5GC network connection may be configured as the default candidate cell for a UE when the UE performs a cell (re)selection procedure. So, by setting a suitable cell that supports at least a 5GC network connection as the default cell type during cell (re)selection procedure, the UE may ignore the cell that only supports EPC while the UE is implementing a cell (re)selection procedure. In one aspect of the present embodiments, in order to configure the suitable cell that supports the 5GC network connection as the default candidate cell, the UE may assign cells that do not support the 5GC network connection as non-suitable cells during the process of assigning different cell (re) selection priority levels to the different candidate cells.

In some of the present embodiments, the UE may consider the cells that support the 5GC network connection as the default candidate cell during cell (re)selection procedure after the AS layer of the UE (e.g., AS layer 920) receives a Connection Resume Request message from the NAS layer (e.g., a NAS procedure triggered by NAS layer 910). In addition, the AS layer of the UE (e.g., AS layer 920) may need not to report the supported CN types of camped cell to the NAS layer (e.g., NAS layer 910) after (re)selecting a new camped cell if the Connection Resume Request message is pending in the NAS layer 910 of the UE (or being updated by another Connection Resume Request message by the NAS layer 910 of the UE). Moreover, in some of the present embodiments, the proposed design described above may be applied to the '2-step resume procedure' in the AS layer. For example, after receiving the Connection Resume Request message from the NAS layer (e.g., NAS layer 910), the AS layer of the UE (e.g., AS layer 920) may start a random access procedure with the camped cell to transmit an RRC Connection Resume Request message to request resuming the RRC Connection with the camped cell. Then, after receiving the RRC Connection Resume Request message from the UE, the camped cell may redirect the UE to reselect another cell by sending a dedicated control signaling to the UE as a response to the RRC Connection Resume Request message (e.g., RRCConnectionRelease message with redirectedCarrierInfo and suspendConfig). After receiving the dedicated control signaling (with redirectedCarrierInfo and suspendConfig), the UE may implement a cell (re)selection procedure based on the received direct configuration. In addition, the UE may consider the cells that support the 5GC network connection as the default candidate cell during the cell (re)selection procedure (and therefore, the AS layer of the UE (e.g., AS layer 920) may need not to report the supported CN types of camped cell to the NAS layer (e.g., NAS layer 910) after (re)selecting a new camped cell) since the NAS layer in the UE side may still be pending the original Connection Resume Request message or may trigger another Connection Resume Request message to the AS layer of the UE. It should also be noted that the UE may stay in an RRC inactive state during the 2-step resume procedure.

Figure 10:
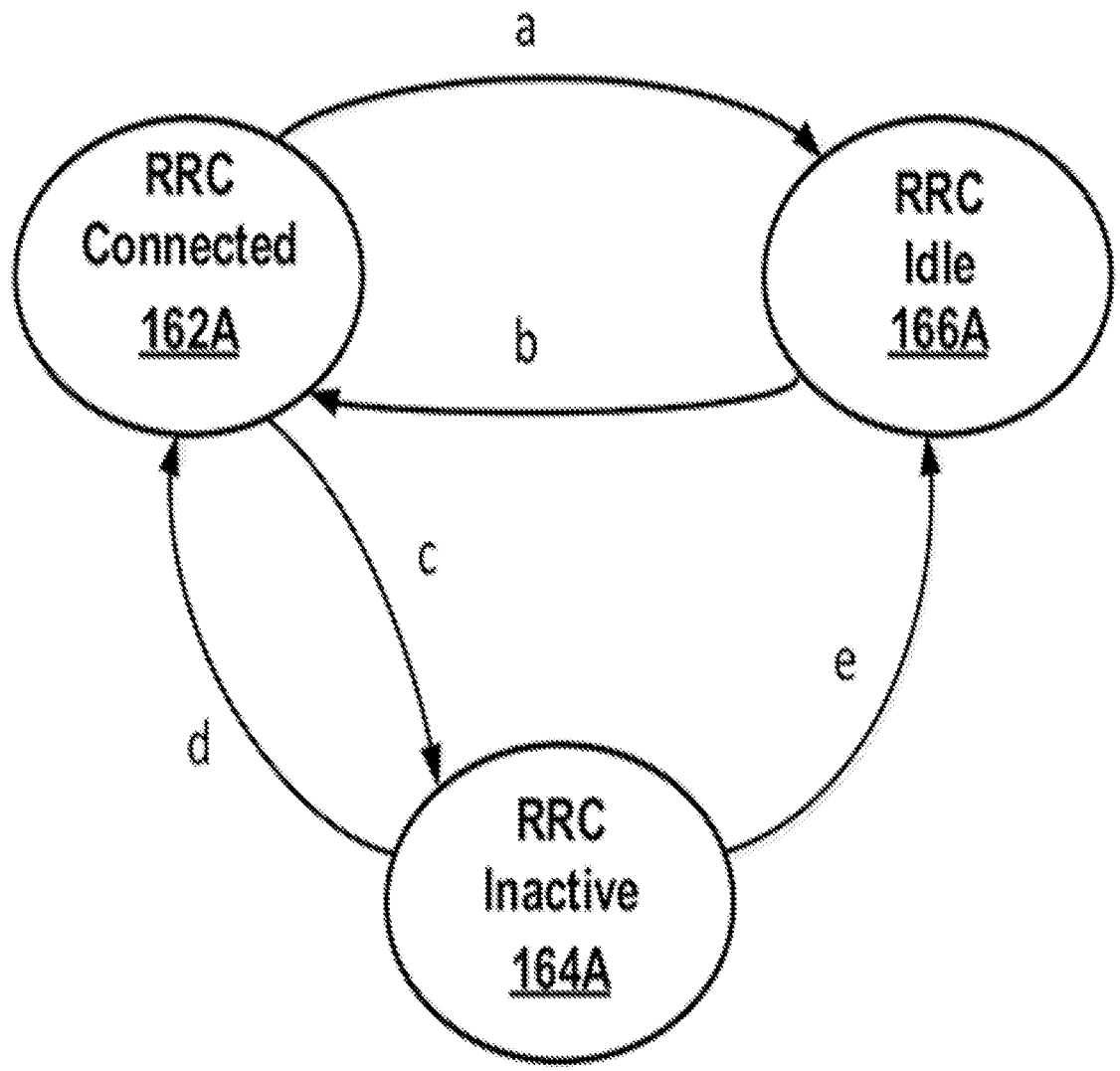
FIG. 10 is an RRC state transition diagram illustrating various RRC state transition procedures that a UE may undergo within an LTE or a 5G New Radio (NR) access network, according to an exemplary implementation of the present application.

FIG. 10 is an RRC state transition diagram illustrating various RRC state transition procedures that a UE may undergo within a next generation radio access network, according to an exemplary implementation of the present application. The RRC state transition diagram 100A may include an RRC Connected state 162A, an RRC inactive state 164A, and an RRC idle state 166A. In the present implementation, the RRC Connected state 162A, RRC inactive state 164A, and RRC idle state 166A are three RRC states independent of one another. As shown in FIG. 10, a UE may transition among the RRC Connected state 162A, RRC inactive state 164A, and RRC idle state 166A through various procedures (e.g., procedures a, b, c, d, and e). For example, a UE may transition to the RRC inactive state 164A from the RRC Connected state 162A, or the RRC idle state 166A, and vice versa. It should be noted that in the RRC state transition diagram 100A, a UE may not transition directly from the RRC idle state 166A to the RRC inactive state 164A. That is, a UE may transition to the RRC inactive state 164A from an RRC idle state 166A through an RRC Connected state 162A. In one implementation, a UE may transition from the RRC Connected state 162A to the RRC inactive state 164A using an RRC Suspend procedure (e.g., procedure c). Conversely, the UE may transition from the RRC inactive state 164A to the RRC Connected state 162A using an RRC Resume procedure (e.g., procedure d).

Figure 11:
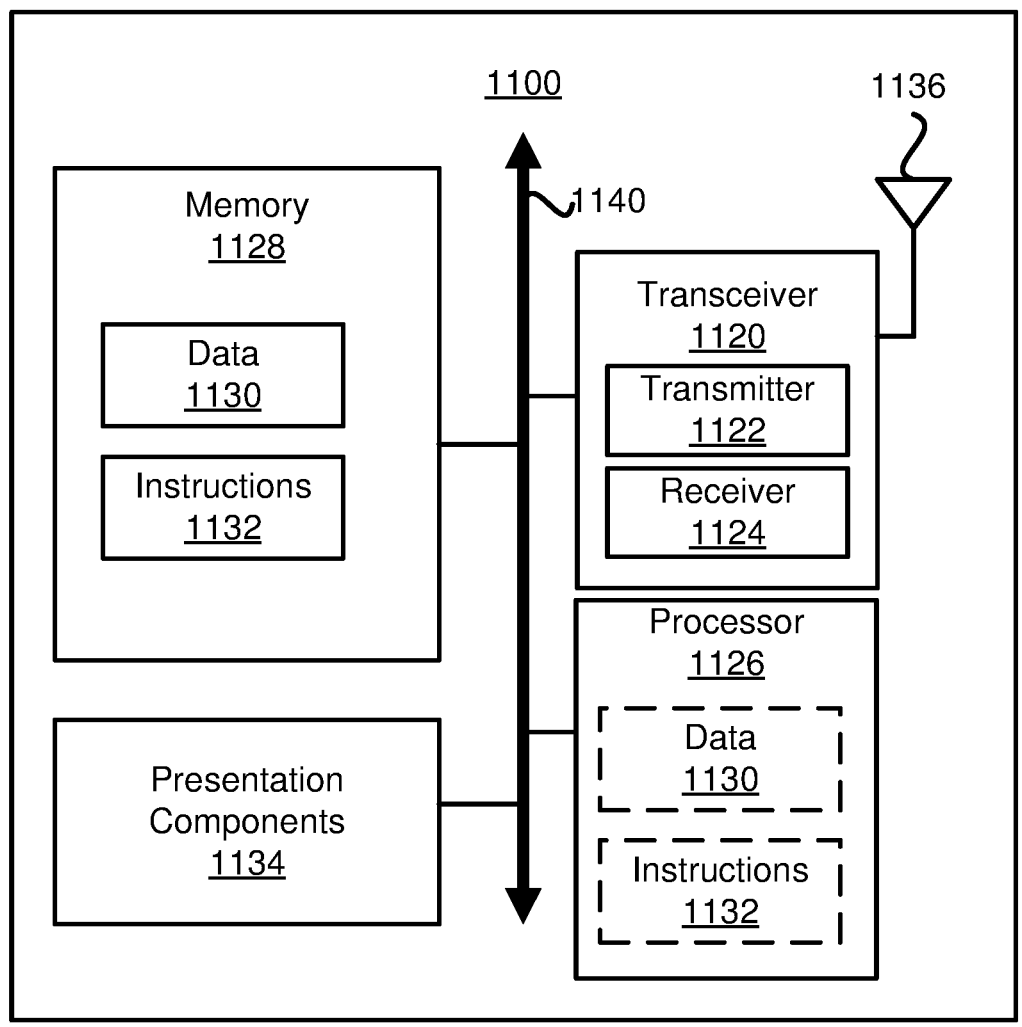
FIG. 11 illustrates a block diagram of a node for wireless communication, in accordance with various aspects of the present application.

FIG. 11 illustrates a block diagram of a node for wireless communication, in accordance with various aspects of the present application. As shown in FIG. 11, node 1100 may include transceiver 1120, processor 1126, memory 1128, one or more presentation components 1134, and at least one antenna 1136. Node 1100 may also include a Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control signalings.

Node 1100 may include a variety of computer-readable media. Computer-readable media can be any available media that can be accessed by node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, and etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 11. Alternatively, instructions 1132 may not be directly executable by processor 1126 but be configured to cause node 1100 (e.g., when compiled and executed) to perform various functions described herein.

Processor 1126 may include an intelligent hardware device, e.g., a central processing unit (CPU), a microcontroller, an ASIC, and etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. For example, one or more presentation components 1134 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for cell selection while the UE is in a radio resource control (RRC) Inactive state, the method comprising:
    receiving, by the UE while connected to a $5^{th}$ Generation Core (5GC) network, a target Evolved Universal Terrestrial Radio Access (E-UTRA) frequency carrier indication via UE-specific downlink (DL) control signaling, the target E-UTRA frequency carrier indication being associated with a target core network (CN) type and redirecting the UE to a target E-UTRA frequency carrier;
    transitioning from an RRC Connected state to an E-UTRA RRC Inactive state based on the UE-specific DL control signaling;
    selecting a suitable cell in a plurality of suitable cells associated with the target E-UTRA frequency carrier while the UE is in the E-UTRA RRC Inactive state, wherein the suitable cell is selected without determining a suitable CN type for the UE; and
    after selecting the suitable cell, determining an Evolved Packet Core (EPC) network as the suitable CN type for the UE.

2. The method of claim 1, wherein selecting the suitable cell comprises selecting the suitable cell based on the UE's serving network.

3. The method of claim 1, further comprising:
    camping on the suitable cell; and
    receiving supported CN types of the UE's serving network via broadcast system information from the suitable cell.

4. The method of claim 1, further comprising:
    camping on the suitable cell;
    determining to change an operating CN type of the UE from the 5GC to the EPC while the UE is camping on the suitable cell; and
    discarding stored RRC Inactive Context and transitioning from the E-UTRA RRC Inactive state to an RRC Idle state.

5. The method of claim 1, wherein:
    the RRC Connected state is a New Radio (NR) RRC Connected state or an E-UTRA RRC Connected state.

6. The method of claim 1, wherein the UE-specific DL control signaling is an E-UTRA RRCConnectionRelease message or a New Radio (NR) RRCRelease message.

7. The method of claim 1, wherein determining the EPC network as the suitable CN type comprises determining the EPC network as the suitable CN type based on the selected suitable cell and the UE-specific DL control signaling.

8. A method for a base station that communicates with a user equipment (UE) for cell (re)selection, the method comprising:
    sending to the UE a first offset value and a second offset value to be used by the UE when the UE performs measurement on a signal strength and a signal quality of a candidate cell in a cell (re)selection procedure,
    wherein the UE adds the first offset value to the measurement after determining that the candidate cell supports at least a $5^{th}$ Generation Core (5GC) network connection, and the UE subtracts the second offset value from the measurement when the candidate cell does not support the 5GC network connection.

9. The method of claim 8, wherein the candidate cell that does not support the 5GC network connection comprises a candidate cell that supports an Evolved Packet Core (EPC) network connection.

10. A user equipment (UE), comprising:
    one or more non-transitory computer-readable media having computer-executable instructions embodied thereon; and
    at least one processor coupled to the one or more non-transitory computer-readable media, and configured to execute the computer-executable instructions to:
    receive, by the UE while connected to a $5^{th}$ Generation Core (5GC) network, a target Evolved Universal Terrestrial Radio Access (E-UTRA) frequency carrier indication via UE-specific downlink (DL) control signaling, the target E-UTRA frequency carrier indication being associated with a target core network (CN) type and redirecting the UE to a target E-UTRA frequency carrier;
    transition from a radio access control (RRC) Connected state to an E-UTRA RRC Inactive state based on the UE-specific DL control signaling;
    select a suitable cell in a plurality of suitable cells associated with the target E-UTRA frequency carrier while the UE is in the E-UTRA RRC Inactive state, wherein the suitable cell is selected without determining a suitable CN type for the UE; and
    after selecting the suitable cell, determine an Evolved Packet Core (EPC) network as the suitable CN type for the UE.

11. The UE of claim 10, wherein selecting the suitable cell comprises selecting the suitable cell based on the UE's serving network.

12. The UE of claim 10, wherein the at least one processor is further configured to execute the computer-executable instructions to:
    camp on the suitable cell; and
    receive supported CN types of the UE's serving network via broadcast system information from the suitable cell.

13. The UE of claim 10, wherein the at least one processor is further configured to execute the computer-executable instructions to:
    camp on the suitable cell;
    determine to change an operating CN type of the UE from the 5GC to the EPC while the UE is camping on the suitable cell; and
    discard stored RRC Inactive Context and transition from the E-UTRA RRC Inactive state to an RRC Idle state.

14. The UE of claim 10, wherein:
    the RRC Connected state is a New Radio (NR) RRC Connected state or an E-UTRA RRC Connected state.

15. The UE of claim 10, wherein: the UE-specific DL control signaling is an E-UTRA RRCConnectionRelease message or a New Radio (NR) RRCRelease message.

16. The UE of claim 10, wherein determining the EPC network as the suitable CN type comprises determining the EPC network as the suitable CN type based on the selected suitable cell and the UE-specific DL control signaling.

* * * * *